US009945671B2

United States Patent
Dacre-Wright et al.

(10) Patent No.: US 9,945,671 B2
(45) Date of Patent: Apr. 17, 2018

(54) NAVIGATION AID METHOD FOR MAKING MULTIPLE TIME CONSTRAINTS

(71) Applicant: THALES, Courbevoie (FR)

(72) Inventors: Benoit Dacre-Wright, Lauzerville (FR); Guy Deker, Cugnaux (FR); Xavier Blanchon, Toulouse (FR)

(73) Assignee: THALES, Courbevoie (FR)

( * ) Notice: Subject to any disclaimer, the term of this patent is extended or adjusted under 35 U.S.C. 154(b) by 523 days.

(21) Appl. No.: 14/604,308

(22) Filed: Jan. 23, 2015

(65) Prior Publication Data
US 2015/0211859 A1 Jul. 30, 2015

(30) Foreign Application Priority Data
Jan. 24, 2014 (FR) ..................... 14 00145

(51) Int. Cl.
*G01C 21/00* (2006.01)
*G05D 1/10* (2006.01)

(52) U.S. Cl.
CPC ............ *G01C 21/00* (2013.01); *G05D 1/101* (2013.01)

(58) Field of Classification Search
CPC .............................. G01C 21/00; G05D 1/101
See application file for complete search history.

(56) References Cited

U.S. PATENT DOCUMENTS

| 5,408,413 | A | 4/1995 | Gonser et al. |
| 6,507,782 | B1 | 1/2003 | Rumbo et al. |
| 7,447,666 | B2 * | 11/2008 | Wang ............... G06F 17/30551 706/14 |
| 8,332,145 | B2 * | 12/2012 | Dacre-Wright ........ G05D 1/101 701/3 |
| 2005/0235356 | A1 * | 10/2005 | Wang ............... G06F 17/30551 726/22 |
| 2007/0100538 | A1 | 5/2007 | Wise et al. |
| 2010/0114407 | A1 | 5/2010 | Klooster et al. |
| 2011/0137493 | A1 * | 6/2011 | Dacre-Wright ........ G05D 1/101 701/3 |

(Continued)

FOREIGN PATENT DOCUMENTS

| EP | 0637787 A1 | 2/1995 |
| FR | 1152604 A1 | 2/1958 |

(Continued)

*Primary Examiner* — Jerrah Edwards
(74) *Attorney, Agent, or Firm* — Baker & Hostetler LLP

(57) ABSTRACT

A method assisting in navigation of aircraft following a flight plan subject to time constraints comprises: determining a minimum speed profile, a maximum speed profile, and minimum and maximum times of passage; determining, for each constraint of index i, a restricted interval and a required interval; the determination made by a first iterative computation, i being decremented from n−1 to 1 and comprising: determining a required interval of index i enabling the aircraft to observe a restricted interval of index i+1 by flying at a speed profile between the minimum and maximum speed profiles, the restricted interval of index i+1 determined on the preceding iteration for an iteration of index between 1 and n−2, or from the time constraint of index n for the iteration of index n−1; and determining a restricted interval of index i from the intersection of the time constraint and the required interval of index i.

26 Claims, 18 Drawing Sheets

(56) References Cited

U.S. PATENT DOCUMENTS

2012/0253650 A1 10/2012 Wachenheim et al.
2013/0144518 A1 6/2013 Dacre-Wright et al.
2013/0317739 A1 11/2013 Coulmeau et al.

FOREIGN PATENT DOCUMENTS

FR 2946161 A1 12/2010
WO 02093281 A1 11/2002

* cited by examiner

NAVIGATION AID METHOD FOR MAKING MULTIPLE TIME CONSTRAINTS

CROSS-REFERENCE TO RELATED APPLICATION

This application claims priority to foreign French patent application No. FR 1400145, filed on Jan. 24, 2014, the disclosure of which is incorporated by reference in its entirety.

FIELD OF THE INVENTION

The present invention relates to a method for assisting in the navigation, including flight planning and mission tracking, of an aircraft following a flight plan and subjected to a plurality of time constraints called RTA (Request Time of Arrival) that makes it possible to detect the mutually incompatible constraints to provide the information necessary for their possible adjustment, and, where appropriate, optimise the flight by computing a speed setpoint that makes it possible for the aircraft to make the plurality of RTA. It applies notably to the field of avionics, and more particularly to the flight management device of an aircraft, hereinafter designated by the acronym FMS, standing for Flight Management System.

BACKGROUND

The significant growth in air traffic has led to a need for increasing synchronisation between the aircraft and the management of the traffic by air traffic controllers. This synchronisation requires, on the one hand, a capacity for temporal prediction of the trajectories by the equipment on board the aircraft, but also reliability in making these temporal predictions during the flight. Furthermore, the controllers have to ensure the separation and scheduling of the aircraft throughout the flight and, more particularly, in the approach phases. One of the options for ensuring the synchronisation and scheduling of the aircraft during the flight is to impose upon them one or more time constraints (RTA—Required Time of Arrival) during the flight.

These days, the flight management computers (Flight Management Systems) can take into account only a single time constraint, or, when several constraints can be entered into the flight plan, only the first is taken into account in computing the predictions and the speed setpoints (EP0637787), or else the constraints are activated individually (EP1800197). Furthermore, the methods for computing these speed predictions for making an RTA rely on iterative computations, which are difficult to manage for a number of simultaneous constraints.

When the time constraint is proposed in time interval form (earliest constraint, latest constraint, or a combination of the two), it is impossible to exploit this flexibility to choose a time of passage that makes it possible to make the subsequent constraints, or even optimises same.

Some existing methods such as (US 2012/0253650/ FR1152604) make it possible to predict the possible times of passage of the aircraft at different points of the flight plan, by taking into account the preceding time constraints and the flight envelope of the aircraft. However, not one makes it possible to anticipate the constraints to impose times of passage that make it possible to ensure that the subsequent constraints are made.

SUMMARY OF THE INVENTION

One aim of the present invention is to mitigate at least the abovementioned drawbacks, by proposing a method for assisting in the navigation of an aircraft that determines restricted constrained time intervals associated with each time constraint making it possible to make the subsequent constraints, and to determine, from these intervals, constraints that are incompatible with making the subsequent constraints.

The subject of the present invention is a method for assisting in the navigation of an aircraft following a flight plan subject to a plurality of time constraints indexed by the index i varying from 1 to n, the index 1 corresponding to a time constraint closest to a current position of the aircraft and the index n corresponding to a time constraint furthest away from the current position, the position of the aircraft on the flight plan being identified as a function of a curvilinear abscissa X, a time constraint of index i being delimited by an earliest time of passage and a latest time of passage and corresponding to a curvilinear abscissa $X^i$, the method comprising the steps consisting in:

determining a minimum speed profile, a maximum speed profile, and minimum and maximum times of passage for an aircraft performing a flight respectively at the minimum and maximum speeds as a function of the curvilinear abscissa X, determining, for each constraint of index i, a restricted interval corresponding to a restricted time constraint interval and a required interval corresponding to a required time of passage interval of the aircraft at the waypoint of curvilinear abscissa $X^i$, said determination being made on the basis of minimum and maximum time-of-passage profiles and, by a first iterative computation, i being decremented from n−1 to 1 and consisting in:

determining a required interval of index i enabling the aircraft to observe a restricted interval of index i+1 by flying according to a speed profile lying between the minimum and maximum speed profiles, said restricted interval of index i+1 being determined on the preceding iteration for an iteration of index lying between 1 and n−2, or from the time constraint of index n for the iteration of index n−1, determining a restricted interval of index i from the intersection of the time constraint and of the required interval of index i, a required interval of index i making it possible to observe all the restricted intervals of indices greater than i by flying according to a speed profile lying between the minimum and maximum speed profiles, when the constraints of indices greater than i are mutually compatible.

Advantageously, the restricted interval of index i is equal to the intersection of the time constraint and of the required interval of index i.

According to another variant, the restricted interval of index i is equal to the intersection minus a robustness margin.

According to a preferred embodiment, during the first iterative computation, when said intersection is empty, the method further comprises the steps consisting in:

identifying the corresponding time constraint as incompatible constraint and its index as incompatible constraint index, loading a first chosen time constraint determined according to a first criterion or chosen by the pilot and, resuming said first iterative computation at the incompatible constraint index minus 1 and from a restricted interval corresponding to said loaded first chosen time constraint.

Advantageously, the first criterion corresponds to choosing, as first chosen time constraint, the limit of the time constraint of incompatible constraint index closest to said required interval of incompatible constraint index.

Advantageously, the step of determining the required interval of index i comprises the substeps consisting in:

performing a translation of the curve of maximum time of passage as a function of the curvilinear abscissa X such that it passes through the upper limit of the restricted interval of index i+1 of abscissa $X^{i+1}$, choosing, as upper limit of the required interval, the value of the curve translated from the preceding substep to the curvilinear abscissa $X^i$, performing a translation of the curve of minimum time of passage as a function of the curvilinear abscissa X such that it passes through the lower limit of the restricted interval of index i+1 of abscissa $X^{i+1}$, choosing, as lower limit of the required interval ($ETA_R^i$), the value of the curve translated from the preceding substep to the curvilinear abscissa $X^i$.

Advantageously, the method according to the invention further comprises a step of computation of a required interval at the current position of the aircraft from the restricted interval of index 1.

According to a first embodiment, the method according to the invention further comprises the step consisting in determining, for each constraint of index i, a constrained estimation interval corresponding to an estimated interval of constrained time of arrival of the aircraft at the waypoint of curvilinear abscissa $X^i$ and a possible interval corresponding to an interval of the possible estimated times of passage of the aircraft at the waypoint of curvilinear abscissa $X^i$, the determination being made from minimum and maximum time-of-passage profiles and by a second iterative computation, i being incremented from 1 to n, and consisting in:

determining a possible interval of index i of possible estimated times of passage of the aircraft at the curvilinear abscissa $X^i$ by flying according to a speed profile lying between the minimum and maximum speed profiles and observing a constrained estimation interval determined on the preceding iteration for an iteration of index lying between 2 and n, or from the current position of the aircraft for the iteration of index 1, determining a constrained estimation interval of index i from the intersection of the time constraint and of the possible interval of index i.

During the second iterative computation, when the intersection is empty:

identifying the corresponding time constraint as unmakeable constraint and its index as unmakeable constraint index, loading a chosen second constraint determined according to a second criterion or chosen by the pilot, and, resuming the second iterative computation at the unmakeable constraint index plus 1 and from a constrained estimation interval corresponding to the chosen loaded second constraint, a possible interval of index i making it possible to observe all the constrained estimation intervals of index less than i by flying according to a speed profile lying between the minimum and maximum speed profiles, when all the constraints of indices less than i can be made.

Advantageously, the second criterion corresponds to choosing, as second chosen time constraint, the limit of the possible interval of unmakeable constraint index closest to the time constraint of unmakeable constraint index.

Advantageously, the step of determining the possible interval for the index i comprises the substeps consisting in:

performing a translation of the curve of maximum time of passage as a function of the curvilinear abscissa X such that it passes through the lower limit of the constrained estimated interval index i−1 of abscissa $X^{i-1}$, choosing, as lower limit of the possible interval, the value of the translated curve from the preceding substep to the curvilinear abscissa $X^i$, performing a translation of the curve of minimum time of passage as a function of the curvilinear abscissa X such that it passes through the upper limit of the constrained estimated interval of index i−1 of abscissa $X^{i-1}$, choosing, as upper limit of the possible interval, the value of said translated curve from the preceding substep to the curvilinear abscissa $X^i$.

According to a variant, the method in which the first iterative computation is completed, further comprises a step consisting in graphically displaying time constraints, corresponding required intervals, and a compatible or non-compatible state for each constraint displayed.

Furthermore, advantageously, the method in which the second iterative computation is completed displays, in the display step and for each displayed constraint, corresponding possible intervals, and a makeable or unmakeable state.

Advantageously, the method according to the invention further comprises a step consisting in modifying and/or inserting at least one time constraint to which the flight plan is subject.

According to a second embodiment, the method according to the invention in which the first iterative computation is completed, further comprises a computation of speed setpoint V(X) determined from the current abscissa $X_{cour}$ of the aircraft and comprises the steps consisting in:

determining a speed strategy, determining a speed setpoint V(X) comprising the substeps consisting in:

initialising at $X_0 = X_{cour}$

For a computation abscissa $X_0$ increasing from $X_{cour}$ to $X^n$:

determining the two successive constraints $X^{i-1}$ and $X^i$ such that:

$$X_0 \in [X^{i-1}; X^i],$$

loading the restricted interval $RTA_R^i$ of index i, determining the associated required interval $ETA_R(X)$ from the loaded restricted interval $RTA_R^i$, determining a speed setpoint $V(X_0)$ from the minimum $V_{min}(X_0)$ and maximum $V_{max}(X_0)$ speed profiles, of associated required interval $ETA_R(X_0)$, and of a predicted time $T(X_0)$ at the computation abscissa $X_0$.

Advantageously, the speed setpoint is determined on the basis of the minimum $V_{min}(X)$) and maximum $V_{max}(X)$ speed profiles weighted by proportionality ratios between the current time $T(X_0)$, the upper limit $ETA_{R\ sup}(X_0)$ and the lower limit $ETA_{R\ inf}(X_0)$ of the associated required interval $ETA_R(X_0)$ at the abscissa $X_0$.

Advantageously, the speed setpoint $V(X_0)$ is determined by the relationship:

$$V(X_0) = \frac{(ETA_{R\ sup}(X0) - ETA_{R\ inf}(X0))V_{min}(X0)V_{max}(X0)}{(ETA_{R\ sup}(X0) - T(X0))V_{max}(X0) - (ETA_{R\ inf}(X0) - T(X0))V_{min}(X0)}$$

$T(X_0)$ designating the predicted time,
$ETA_{R\ sup}(X_0)$ the upper limit of the required interval $ETA_R(X)$ at the abscissa $X_0$, $ETA_{R\ inf}(X_0)$ the lower limit of the required interval $ETA_R(X)$ at the abscissa $X_0$.

According to a variant, the step of determining a speed profile is performed from a plurality of sets of parameters, a set of parameters comprising:
- a first speed profile $V_A(X)$, and a first time of passage $T_{VA}(X)$, resulting from the speed profile $V_A(X)$,
- a second speed profile $V_B(X)$ and a second time of passage $T_{VB}(X)$ resulting from the speed profile $V_B(X)$, the speeds $V_A(X)$ and $V_B(X)$ satisfying the relationship:

$$V_{min}(X) \le V_A(X) \le V_B(X) \le V_{max}(X)$$

- a first abscissa $X_1$ with $X_0 \le X_1 \le X^i$ and a first reference time $T_1$ such that $T_1 \in ETA_R(X1)$
- a second abscissa $X_2$ with $X_0 \le X_2 \le X^i$ and a second reference time $T_2$ such that $T_2 \in ETA_R(X2)$
- a lower time profile $ETA_{RA1}(X)$ making it possible to achieve the first reference time $T_1$ corresponding to the translation of the first time of passage $T_{VA}(X)$ such that it passes through the first reference time $T_1$ at the abscissa $X_1$,
- an upper time profile $ETA_{RB2}(X)$ making it possible to achieve the second reference time $T_2$ corresponding to the translation of the second time of passage $T_{VB}(X)$ such that it passes through the second reference time $T_2$ at the abscissa $X_2$.

Furthermore, the step of determining a speed setpoint $V(X)$ comprises the substeps consisting in:
- segmenting the required interval $ETA_R(X_0)$ into a plurality of subintervals according to the speed strategy,
- associating, with each subinterval, a set of parameters according to the speed strategy,
- determining a subinterval $I_0$ in which the predicted time $T(X_0)$ is situated and,
- applying the speed strategy to said subinterval $I_0$ consisting in computing a speed setpoint $V(X_0)$ from the set of parameters associated with said subinterval $I_0$,
- the speed strategy consisting in choosing the speed setpoint $V(X_0)$ equal to $V_A(X_0)$ or $V_B(X_0)$ or to a setpoint $V_{A/B}(X_0)$, the setpoint $V_{A/B}(X_0)$ being determined on the basis of the speed profiles $V_A(X_0)$ and $V_B(X_0)$ weighted by the proportionality ratios between the current time $T(X_0)$, the lower time profile $ETA_{RA1}(X0)$ and the upper time profile $ETA_{RB2}(X_0)$.

Advantageously, the setpoint $V_{A/B}(X_0)$ is determined by the formula:

$$V_{A/B}(X_0) = \frac{(ETA_{RB2}(X_0) - ETA_{RA1}(X_0))V_A(X_0)V_B(X_0)}{(ETA_{RB2}(X_0) - T(X_0))V_B(X_0) - (ETA_{RA1}(X_0) - T(X_0))V_A(X_0)}$$

Advantageously, the first speed profile $V_A(X)$ or the second speed profile $V_B(X)$ is equal to a preferred speed profile $V_{opt}(X)$ corresponding to a speed of the aircraft computed for optimum flight conditions according to determined flight criteria, and not taking into account the plurality of constraints $RTA^i$.

As a variant, the method according to one of the preceding claims further comprising the steps consisting in:
- computing a lateral trajectory,
- computing predicted parameters corresponding to predictions of flight parameters, such as an altitude profile, a speed profile, a weight of the aircraft, a predicted time of passage $T(X^i)$ for each constraint $RTA^i$ of the flight plan,
- displaying predicted parameters such as, for each constraint, the predicted time of passage $T(X^i)$ and/or the corresponding percentage of the constraint interval, the status of the constraint, the deviations from the constraint.

Advantageously, the method according to the invention further comprises a step consisting in modifying and/or inserting at least one time constraint to which the flight plan is subject.

According to another aspect, the invention relates to a device matched to an aircraft following a flight plan subject to a plurality of time constraints, the device comprising means for implementing the steps of the method according to the invention.

According to another aspect, the invention relates to a system comprising the device according to the invention.

According to another aspect, the invention relates to a computer program product, said computer program comprising code instructions making it possible to perform the steps of the method according to the invention.

BRIEF DESCRIPTION OF THE DRAWINGS

Other features, aims and advantages of the present invention will become apparent on reading the following detailed description and in light of the attached drawings given as nonlimiting examples and in which.

DETAILED DESCRIPTION

We will first of all explain the concepts of minimum speed profile $V_{min}(X)$ and maximum speed profile $V_{max}(X)$ as a function of the curvilinear abscissa X, and the concepts of minimum $T_{Vmin}(X)$ and maximum $T_{Vmax}(X)$ times of passage for an aircraft performing a flight respectively at the speeds $V_{min}(X)$ and $V_{max}(X)$ known from the patent U.S. Ser. No. 12/790,596.

Figure 1:
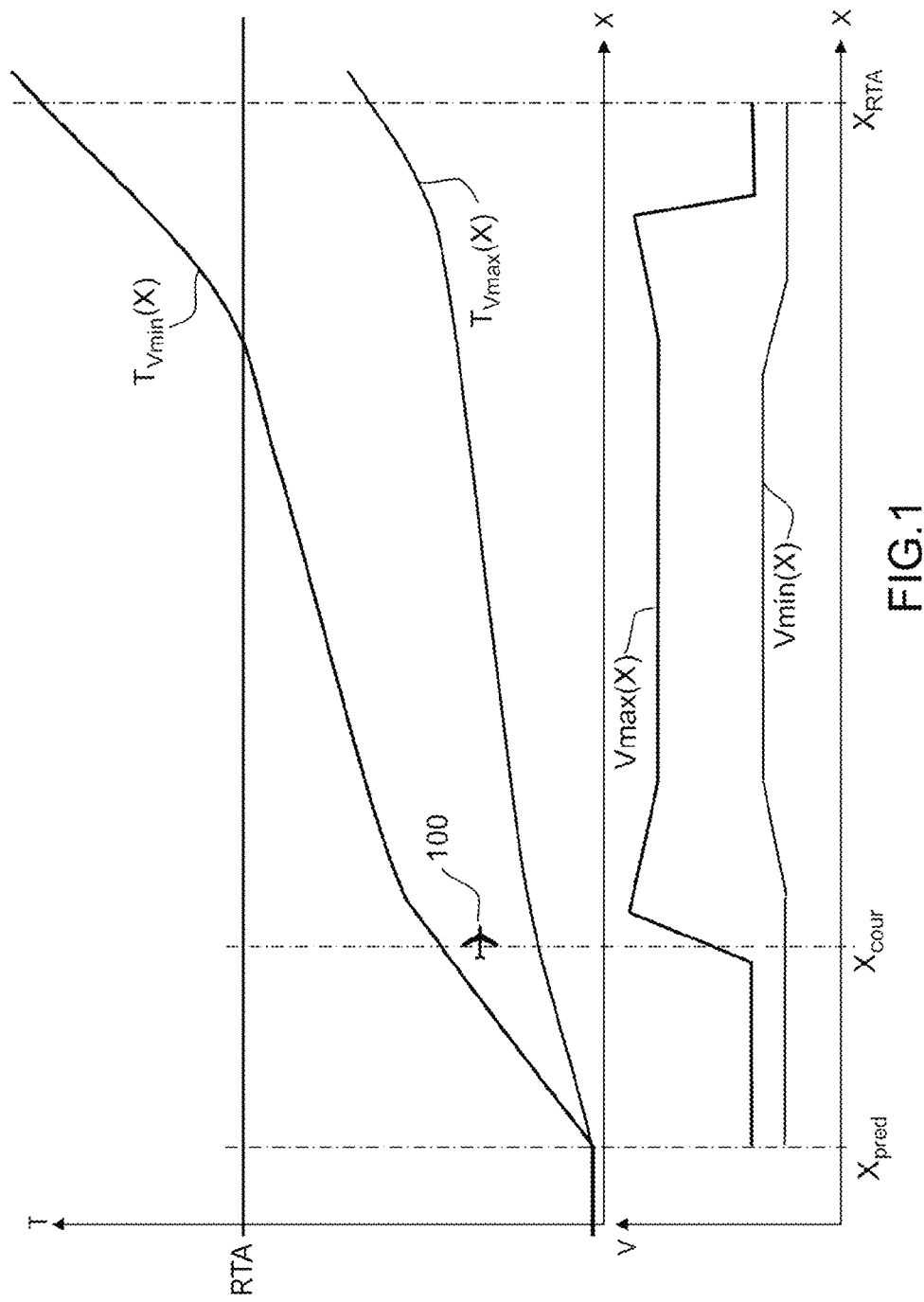
FIG. 1 presents examples of curves representing speeds and times of passage of an aircraft on curvilinear abscissae X along its flight plan.

FIG. 1 presents examples of curves representing the times of passage of an aircraft on curvilinear abscissae along its flight plan, for flights following different speed profiles. Hereinbelow, the letter X denotes the curvilinear abscissa of an aircraft 100, along a flight plan, that is to say a distance between a point of the flight plan and a reference point of the flight plan. A prediction of the time of passage T(X) of the aircraft 100 at the curvilinear abscissa X is produced at an abscissa point $X_{pred}$. The objective of the aircraft is to reach the RTA at the curvilinear abscissa $X_{RTA}$, in other words to make a single and punctual time constraint.

A first curve $T_{Vmin}(X)$ represents the times of passage of the aircraft 100 as a function of the curvilinear abscissa X, assuming that the matter is moving according to a minimum speed profile $V_{min}(X)$ corresponding to the lower limit of the flight envelope along the profile, possibly increased by an operational margin in order, for example, to limit the acceleration inertia at the low speeds or even the temporary risks of excessively low speed generated, for example, by wind gusts, or to mitigate the uncertainties of the atmospheric model. This minimum speed profile is known for the aircraft 100, and depends notably on its performance levels, on its state (altitude, weight in particular) according to the different flight configurations and in the different flight phases following the flight plan, on the atmospheric conditions, and on any additional limitations specified by the pilot or the airline responsible for operating the aircraft.

A second curve $T_{Vmax}(X)$ represents the times of passage of the aircraft 100 as a function of the curvilinear abscissa X, assuming that the latter is moving according to a maximum speed profile $V_{max}(X)$ corresponding to the upper limit of the flight envelope along the profile, possibly minus an operational margin in order, for example, to limit the temporary risks of overspeed generated, for example, by wind gusts, or to mitigate the uncertainties of the atmospheric model. Similarly, this maximum speed profile is known for the aircraft 100, and depends notably on its performance levels, on its state according to the different flight configurations and in the different flight phases following the flight plan, on the atmospheric conditions and on any additional limitations specified by the pilot or the airline responsible for operating the aircraft.

Parallel to the curves $T_{Vmin}(X)$ and $T_{Vmax}(X)$ representing the times of passage of the aircraft 100 as a function of the curvilinear abscissa X along the flight plan, examples of curves $V_{min}(X)$ and $V_{max}(X)$ representing the speed profiles are given in FIG. 1. The two curves of times of passage are increasing, and the slope of one curve of times of passage becomes less steep as the speed of the aircraft 100 increases.

It should be noted that, hereinbelow, it is considered, as a first approximation, that the lateral trajectories of the aircraft 100 are identical, regardless of the speed profile considered. As explained in the patent U.S. Ser. No. 12/790,596, this approximation can be lifted and the difference of the lateral profiles at the minimum and maximum speeds can be taken into account by interpolation between the times of passage at the characteristic points of the flight plan, on the different profiles.

It can also be observed that, regardless of the reference speed profile considered, that is to say $V_{min}(X)$, or $V_{max}(X)$, the ground speed of the aircraft 100 depends only on the curvilinear abscissa X, and not on the time. This approximation is based on the assumption that the properties of a stationary system are applicable. These properties of stationarity are linked to the fact that the atmospheric model used is stationary. However, it is possible to consider, as an approximation, that the system is quasi-stationary, if variations of the meterological data are modelled, but remain slow, which is generally the case in practice, with regard to the time of passage deviations between the profile $V_{min}(X)$ and the profile $V_{max}(X)$.

The times of passage T(X) predicted at the curvilinear abscissa $X_{pred}$ are memorised, to be used when the predictions are subsequently refreshed.

There is therefore, for any curvilinear abscissa X along the trajectory, a pair of ground speeds $V_{min}(X)$, $V_{max}(X)$, and a pair of times of passage $T_{Vmin}(X)$, $T_{Vmax}(X)$. These times of passage can, if appropriate, be saved only on the changes of lateral segments, or on the waypoints of the route.

The method according to the invention is a method for assisting in the navigation of an aircraft following a flight plan subject to a plurality of time constraints denoted $RTA^i$ indexed by the index i, i varying from 1 to n. The index 1 corresponds to the time constraint closest to a current position $P_{cour}$ of the aircraft and the index n corresponds to a time constraint furthest away from the current position, the position of the aircraft on the flight plan being identified as a function of a curvilinear abscissa X.

A time constraint of index i $RTA^i$ is defined by a first interval delimited by an earliest time of passage $RTA_{inf}^i$ and a latest time of passage $RTA_{sup}^i$, the limits $RTA_{inf}^i$ and $RTA_{sup}^i$ being able to be merged for certain values of i. A constraint $RTA^i$ of index i has a corresponding curvilinear abscissa $X^i$.

Figure 2:
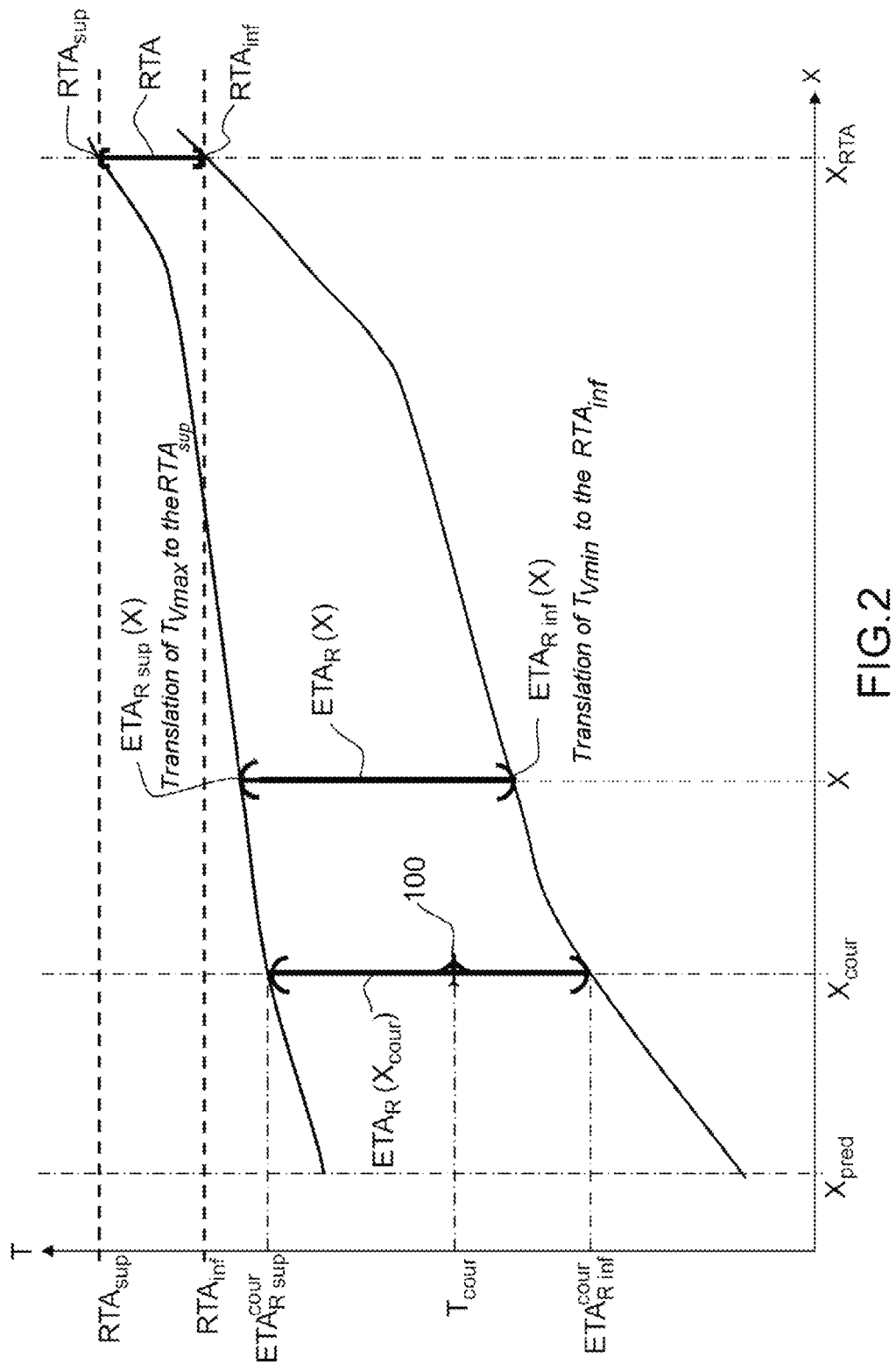
FIG. 2 illustrates the concept of required time of passage.

FIG. 2 illustrates the concept of required time of passage, by taking into account the minimum and maximum times of passage, associated with a constraint interval RTA.

A time-of-arrival constraint RTA of time interval type compels passing at a given point $P_{RTA}$ of the trajectory, called waypoint of the RTA, within a time interval defined by an earliest time of passage $RTA_{inf}$ and a latest time of passage $RTA_{sup}$.

For any X, it is possible to compute a time-of-passage interval $ETA_R(X)$ required to make the constraint RTA, delimited by a lower limit $ETA_{R inf}(X)$ and an upper limit $ETA_{R sup}(X)$.

$ETA_{R inf}(X)$ corresponds to the time of passage required to make the RTA by flying at Vmin.

$ETA_{R sup}(X)$ corresponds to the time of passage required to make the RTA by flying at Vmax.

The required $ETA_R$ profiles are expressed as:

$ETA_R$ required to make the RTA by flying at Vmin:

$$ETA_{R\ inf}(X) = T_{Vmin}(X) + RTA_{inf} - T_{Vmin}(P_{RTA})$$

$ETA_R$ required to make the RTA by flying at Vmax:

$$ETA_{R\ sup}(X) = T_{Vmax}(X) + RTA_{sup} - T_{Vmax}(P_{RTA})$$

The profile $ETA_{R\ inf}(X)$ corresponds to the translation of $T_{Vmin}$ which culminates at $RTA_{inf}$.

The profile $ETA_{R\ sup}(X)$ corresponds to the translation of $T_{Vmax}$ which culminates at $RTA_{sup}$.

This interval $ETA_R(X)$ can be determined at the current position of the aircraft $X_{cour}$.

If the aircraft is temporally situated within the interval $ETA_R(X_{cour})$, it is possible for it, by flying according to a speed profile lying between $V_{min}$ and $V_{max}$, to make the time constraint RTA (interval).

If the aircraft is not situated within the interval $ETA_R(X_{cour})$, it will not be able to make the constraint RTA.

Thus, the required time-of-passage interval $ETA_R(X)$ associated with a constraint RTA corresponds to the timeof-passage interval within which the aircraft must be situated to make the constraint RTA, for an abscissa X.

Figure 3:
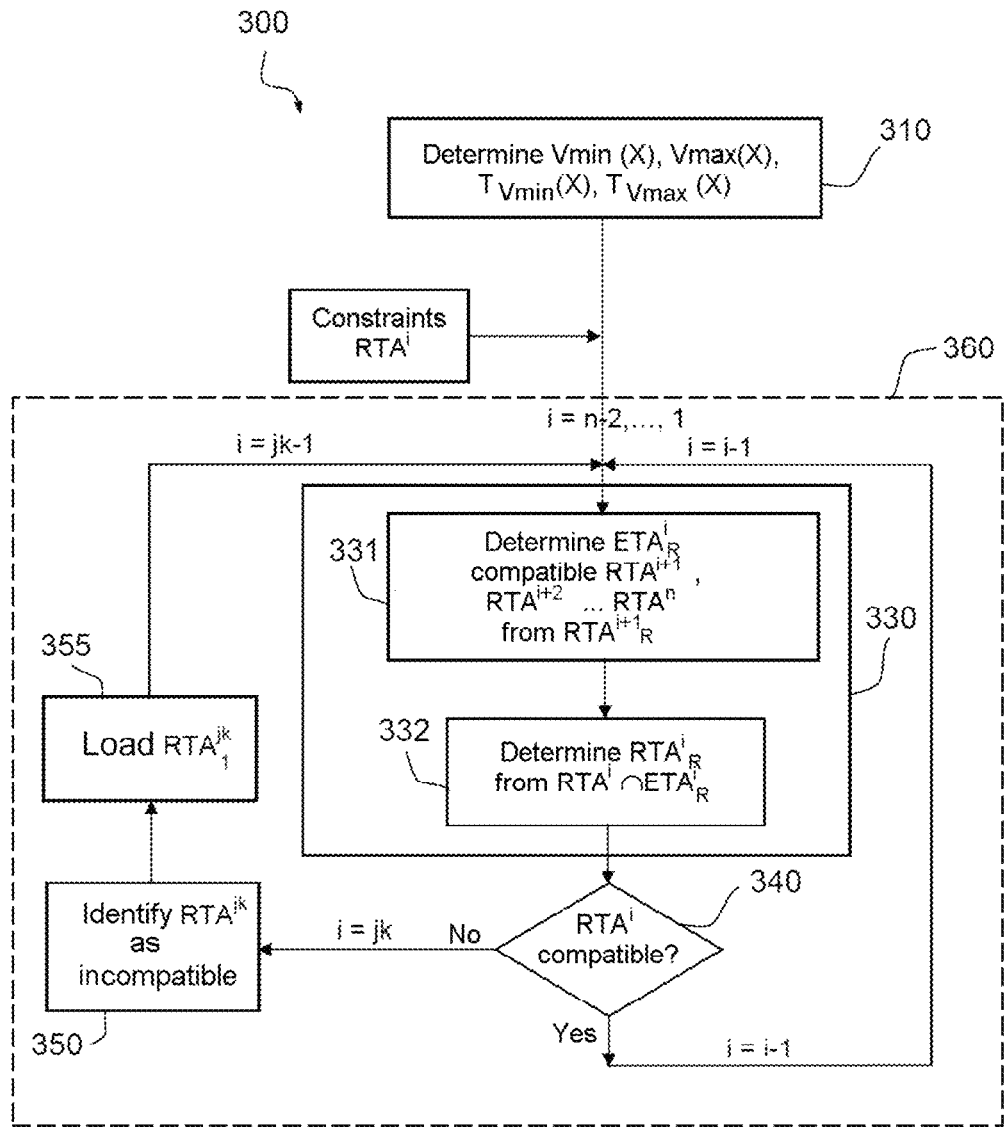
FIG. 3 schematically represents the steps of the method according to the invention.

The navigation assistance method 300 according to the invention is illustrated in FIG. 3.

It makes it possible to determine, for each i, and therefore each $X^i$, required intervals $ETA_R{}^i$ and restricted intervals $RTA_R{}^i$ defined below.

In a step 310, the method computes a minimum speed profile $V_{min}(X)$, a maximum speed profile $V_{max}(X)$, and minimum $T_{Vmin}(X)$ and maximum $T_{Vmax}(X)$ times of passage for an aircraft forming a flight respectively at the speeds $V_{min}(X)$ and $V_{max}(X)$, as a function of the curvilinear abscissa X. These profiles have been described above and in the document U.S. Ser. No. 12/790,596.

In a step 330, the method determines, for each constraint $RTA^i$ of index i, a restricted interval $RTA_R{}^i$ corresponding to a restricted time constraint interval, and a required interval $ETA_R{}^i$ corresponding to a required time-of-passage interval of the aircraft at the waypoint $P_{RTA}{}^i$ of curvilinear abscissa $X^i$.

The determination is made from minimum $T_{Vmin}(X)$ and maximum $T_{Vmax}(X)$ time-of-passage profiles and by a first iterative computation, i being decremented from n−1 to 1.

The first iterative computation comprises a substep 331 of determining a required interval $ETA_R{}^i$ of index i enabling the aircraft to observe a restricted interval of index i+1 $RTA_R{}^{i+1}$ by flying according to a speed profile lying between the minimum $V_{min}$ and maximum $V_{max}$ speed profiles. The restricted interval of index i+1 $RTA_R{}^{i+1}$ is determined:
from the time constraint of index n ($RTA^n$) for the iteration of index n−1
on the preceding iteration for an iteration of index lying between 1 and n−2. The in a substep 332, a restricted interval $RTA_R{}^i$ of index i is determined from the intersection of the time constraint $RTA^i$ and of the required interval $ETA_R{}^i$ of index i.

According to a first variant, $RTA_R{}^i$ is equal to the intersection between $RTA^i$ and $ETA_R{}^i$:

$$RTA_R{}^i = RTA^i \cap ETA_R{}^i$$

According to another variant, a robustness margin is introduced, by reducing the intersection between $RTA^i$ and $ETA_R{}^i$ at its lower and/or upper limits, by a margin defined by a percentage of the interval or by a time value. Thus, $RTA_R{}^i$ is equal to the intersection between $RTA^i$ and $ETA_R{}^i$ minus a robustness margin.

The computation is recursive, and is propagated from the last constraint $RTA^n$ to the first constraint $RTA^1$, the restricted constraint interval $RTA_R{}^{i+1}$ of index i+1 serving as a basis for the computation of the restricted constraint interval $RTA_R{}^i$ of index i.

During the first iterative computation, the intersection $RTA^i \cap ETA_R{}^i$, when it exists, serves as a basis for defining a new interval called restricted interval $RTA_R{}^i$ which corresponds to the time constraint $RTA^i$ reduced to be compatible with making the restricted constraint $RTA_R{}^{i+1}$.

Thus, during the first iterative computation, when all the intersections exist, a restricted interval $RTA_R{}^i$ is compatible with making the constraint of index i and all of the constraints of higher index i+1, i+2 . . . up to n.

Similarly, when the constraints of indices greater than i $RTA^{i+1}, RTA^{i+2}, \ldots, RTA^n$ are mutually compatible, a required interval of index i $ETA_R{}^i$ makes it possible to observe all the restricted intervals of indices greater than i: $RTA_R{}^{i+1'}, RTA_R{}^{i+2} \ldots, RTA^n$, by flying according to a speed profile lying between the minimum $V_{min}$ and maximum $V_{max}$ speed profiles.

Thus, once the first iterative computation is completed, the method 300 according to the invention has computed a restricted interval $RTA_R{}^1$ compatible with all the constraints from 1 to n. At any point of the trajectory, the restricted interval $RTA_R$ computed on the immediately following constraint can be used as single reference to adjust the speed of the aircraft, while ensuring the best observance of all the subsequent constraints.

When the intersection is empty, this means that making the constraint of index i $RTA^i$ is not compatible with making the subsequent constraints i+1 to n.

Thus, in a preferred embodiment, during the first iterative computation, the test 340 verifies, for each i, the existence of the intersection $RTA^i \cap ETA_R{}^i$. If it is not empty, the computation continues, if it is empty, the step 350 identifies the corresponding time constraint as incompatible constraint $RTA^{jk}$ and its index as incompatible constraint index jk.

The step 355 then loads a first chosen time constraint $RTA_1{}^{jk}$ determined according to a first criterion or chosen by the pilot. The objective is to load a constraint that makes it possible to minimise the incompatibility between the constraint lk and the subsequent constraints.

The first iterative computation then resumes at the incompatible constraint index minus 1 jk−1, from a restricted interval $RTA_R{}^{jk}$ corresponding to the first loaded chosen time constraint $RTA_1{}^{jk}$. Thus, the computation is restarted on the basis of a restricted interval $RTA_R{}^{jk} = RTA_1{}^{jk}$ making it possible to minimise the incompatibility of the constraint jk with the subsequent constraints.

Thus, once the first iterative computation is completed, the method 300 according to the preferred embodiment of the invention is either calculated or a restricted interval $RTA_R{}^1$ compatible with all the constraints from 1 to n, or identified the initially incompatible constraints, and replaced them with chosen constraints, so as to obtain a set of constraints that minimise their incompatibility, for an aircraft flying according to a speed profile lying between $V_{min}(X)$ and $V_{max}(X)$.

The priority for the computation is placed on observing the constraints given the performance of the aircraft, the incompatible constraints being identified and replaced. Thus, at any point of the trajectory, the restricted interval $RTA_R$ computed on the immediately following constraint can be used as single reference to adjust the speed of the aircraft, while ensuring the best observance of all the subsequent constraints. Furthermore, the identification of the incompatible constraints and the proposal of the associated required interval $ETA_R$, enables the pilot to propose a possible modification of the time constraint RTA to make it compatible.

Figure 4:
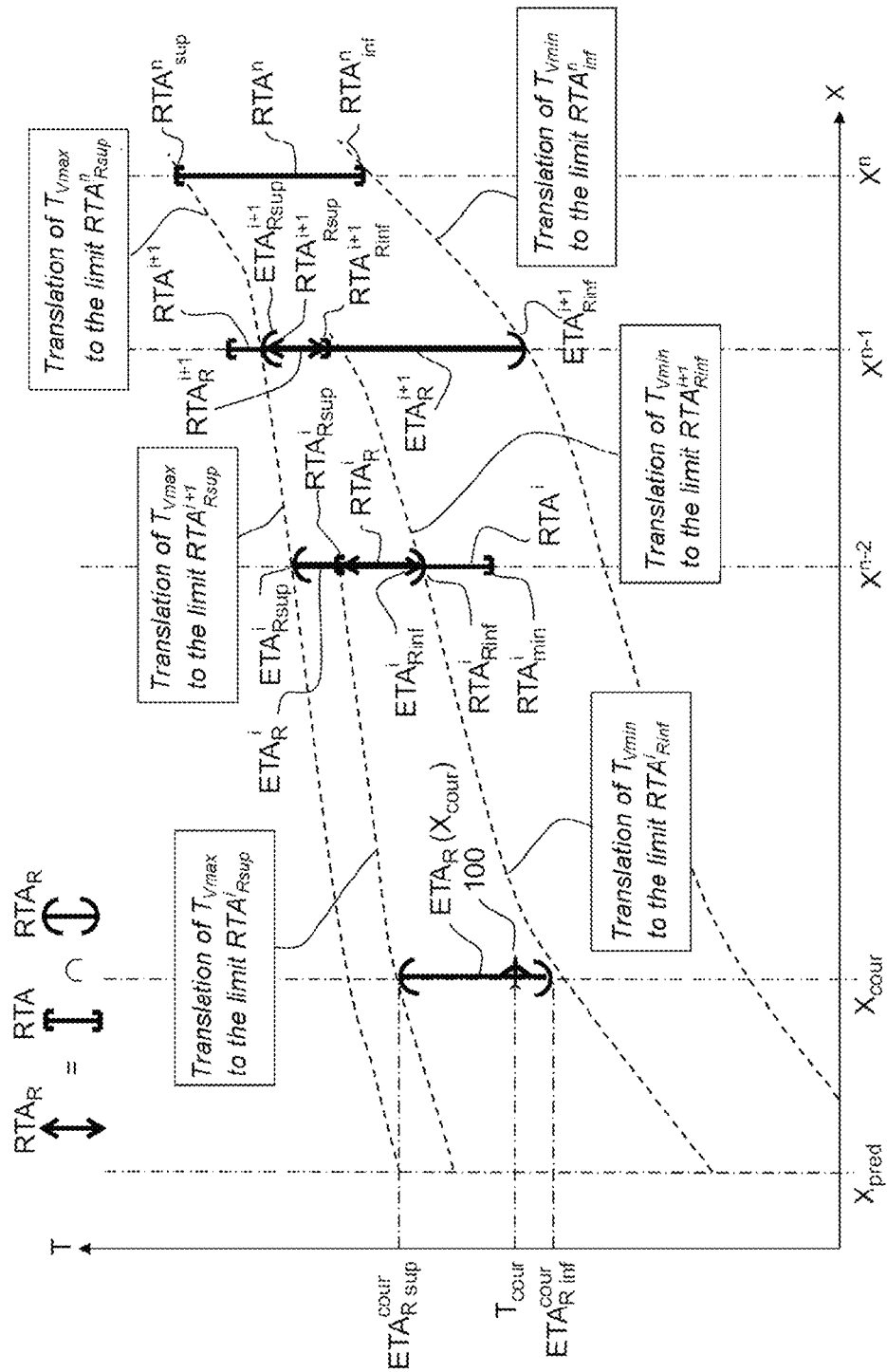
FIG. 4 illustrates a preferred method for computing required intervals.

To determine the required intervals $ETA_R{}^i$, preferably, the method described in FIG. 2 is used, applied recursively from the last constraint of the flight plan to the first, illustrated in FIG. 4.

In other words, the step 331 of determining the required interval $ETA_R{}^i$ comprises the substeps of:
performing a translation of the curve of maximum time of passage as a function of the curvilinear abscissa X $T_{Vmax}(X)$ such that it passes through the upper limit $RTA_{Rsup}{}^{i+1}$ of the restricted interval $RTA_R{}^{i+1}$ of index i+1 and of abscissa $X^{i+1}$,
choosing, as upper limit $ETA_{R\ sup}{}^i$ of the required interval $ETA_R{}^i$, the value of the translated curve at the curvilinear abscissa $X^i$,
performing a translation of the curve of minimum time of passage $T_{Vmin}(X)$ as a function of the curvilinear abscissa X such that it passes through the lower limit $RTA_{Rinf}{}^{i+1}$ of the restricted interval $RTA_R{}^{i+1}$ of index i+1 and of abscissa $X^{i+1}$, choosing, as lower limit $\text{ETA}_{Rinf}^{i}$ of the required interval $\text{ETA}_{R}^{i}$, the value of the translated curve at the curvilinear abscissa $X^{i}$.

This is expressed by the following formulae:

$\text{ETA}_{R}$ required at $\text{RTA}^{(i)}$ to make the $\text{RTA}_{R}^{(i+1)}$ by flying at Vmin:

$$\text{ETA}_{Rinf}^{i}(X^{i})=T_{Vmin}(X^{i})+\text{RTA}_{Rinf}^{i+1}-T_{Vmin}(X^{i+1}) \quad (1)$$

$\text{ETA}_{R}$ required at $\text{RTA}^{(i)}$ to make the $\text{RTA}_{R}^{(i+1)}$ by flying at Vmax:

$$\text{ETA}_{Rsup}^{i}(X^{i})=T_{Vmax}(X^{i})+\text{RTA}_{Rsup}^{i+1}-T_{Vmax}(X^{i+1}) \quad (2)$$

And: The restricted constraint interval at $\text{RTA}^{i}$ to make the subsequent constraints by flying at Vmin:

$$\text{RTA}_{Rinf}^{i}=\max\{T_{Vmin}(X^{i})+\text{RTA}_{Rinf}^{i+1}-T_{Vmin}(X^{i+1}); \text{RTA}_{inf}^{i}\}$$

Restricted constraint interval at $\text{RTA}^{i}$ to make the subsequent constraints by flying at Vmax:

$$\text{RTA}_{Rsup}^{i}=\min\{T_{Vmax}(X^{i})+\text{RTA}_{Rsup}^{i+1}-T_{Vmax}(X^{i+1}); \text{RTA}_{sup}^{i}\}$$

Or even:

$$\text{RTA}_{R\,inf}^{i}=\max\{\text{ETA}_{R\,inf}^{i}(X^{i});\text{RTA}_{inf}^{i}\}$$

$$\text{RTA}_{R\,sup}^{i}=\min\{\text{ETA}_{R\,sup}^{i}(X^{i});\text{RTA}_{sup}^{i}\}$$

This recursive determination makes it possible to synthesise, on each constraint, the time requirements linked to making the subsequent constraints, by applying an adjustment of the time constraints closest to the performance levels of the aircraft. The introduction of operational margins to mitigate any uncertainties can be done by choice, by restricting the required intervals by a time margin, or by imposing a margin on the speed envelope, that is to say on the values of $V_{min}$ and $V_{max}$.

Figure 5:
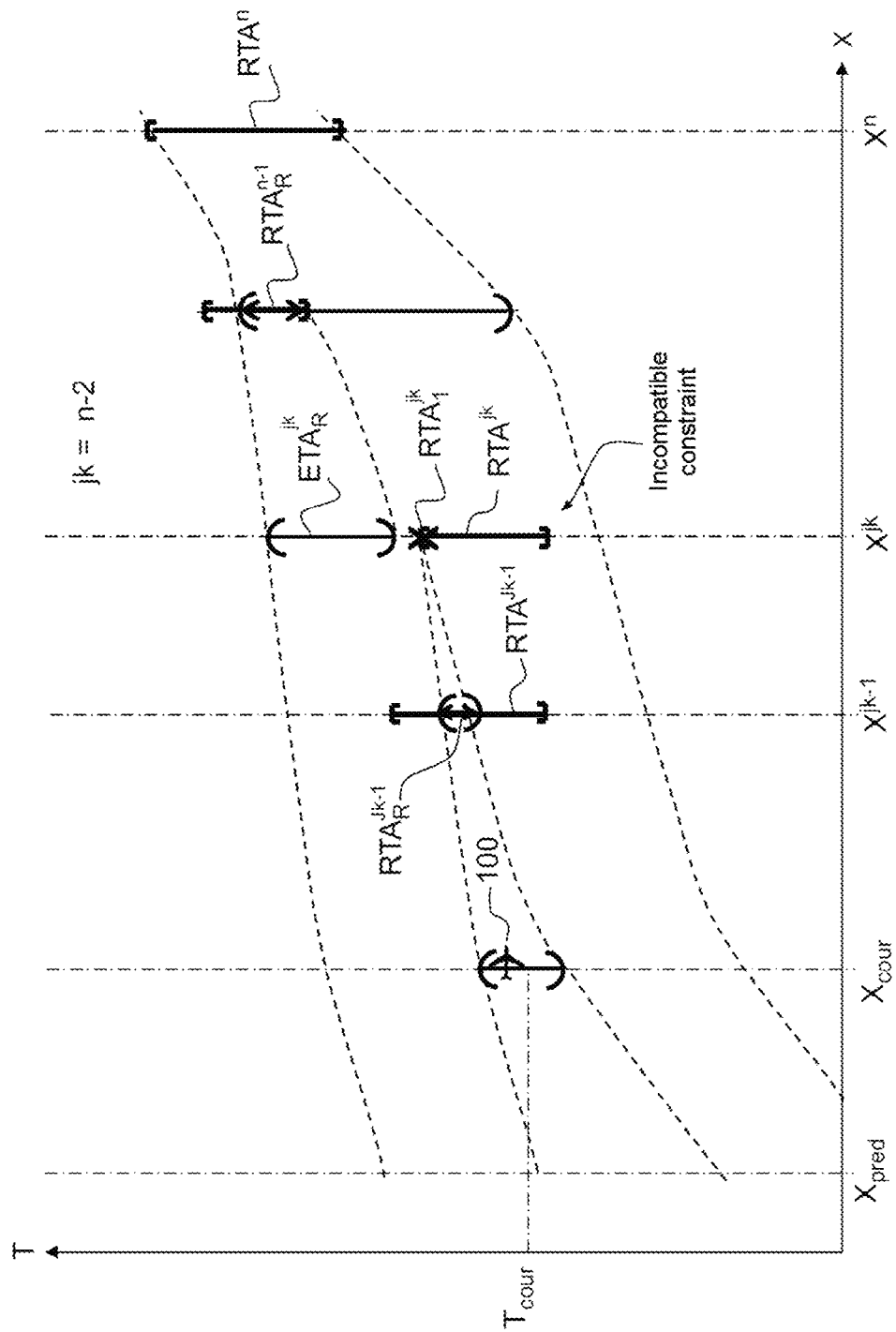
FIG. 5 illustrates a preferred first criterion mode.

According to a preferred embodiment, when the interval is empty for i=lk, the first criterion corresponds to choosing, as chosen time constraint $\text{RTA}_{1}^{jk}$, the limit of the time constraint $\text{RTA}^{jk}$ of incompatible constraint index jk closest to the required interval $\text{ETA}_{R}^{jk}$ of incompatible constraint index jk, as illustrated in FIG. 5.

In other words, for the continuation of the computation, the limit of the interval $\text{RTA}^{i}$ closest to the interval of $\text{ETA}_{R}$ required to make the subsequent constraints is adopted as restricted interval $\text{RTA}_{R}^{jk}$.

Moreover, the required $\text{ETA}_{R}$ closest to this limit determines the minimum modification $\Delta_{comp}^{i}$ of the constraint $\text{RTA}^{i}$, that makes it possible to make the subsequent constraints compatible. This information is useful to the pilot and can guide him or her in subsequently modifying/inserting a constraint.

In this way, the priority is placed on the observance of the constraints, for determining the required (or restricted) intervals, knowing that the operational uncertainties will possibly be able in the rest of the flight to contribute in re-establishing the compatibility with the subsequent constraints.

As a variant, the method 300 comprises a step of computing a required interval $\text{ETA}_{R}^{cour}=\text{ETA}_{R}(X_{cour})$ at the current position of the aircraft $X_{cour}$, from the restricted interval of index 1 $\text{RTA}_{R}^{1}$, as illustrated in FIG. 5, which is an application of FIG. 2 to the interval $\text{RTA}_{R}^{1}$ instead of the interval RTA.

If the current time $T_{cour}$ of the aircraft at the current position $X_{cour}$ lies within the interval $\text{ETA}_{R}^{cour}$, the aircraft is able to make all the time constraints from 1 to n. The first iterative computation propagated to the current position of the aircraft therefore makes it possible to know whether the latter is able to make all the constraints, given its position and its current time. Otherwise, the aircraft is not able to make all the constraints.

Figure 6:
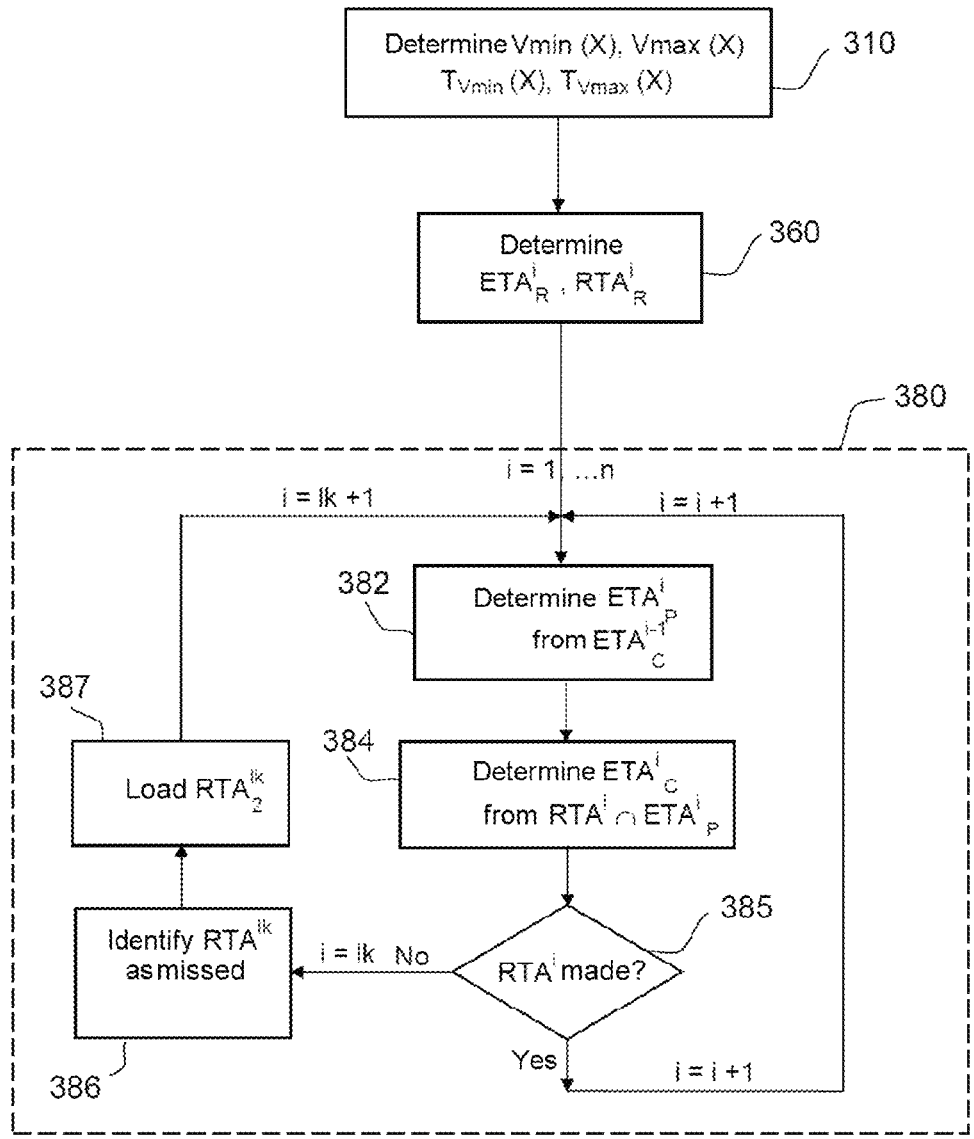
FIG. 6 illustrates the method according to the invention according to a first embodiment.

According to a first embodiment, the method 300 according to the invention further comprises steps that make it possible to compute the time-of-passage intervals taking into account the current position of the aircraft situated downstream of the first constraint $\text{RTA}^{1}$, as illustrated in FIG. 6.

The method according to the invention determines, for each i, a constrained estimated interval $\text{ETAc}^{i}$ corresponding to a constrained estimated time-of-arrival interval of the aircraft at the waypoint $P_{RTA}^{i}$ of curvilinear abscissa $X^{i}$ and a possible interval $\text{ETAp}^{i}$ corresponding to an interval of the possible estimated times of passage of the aircraft at the waypoint $P_{RTA}^{i}$ of curvilinear abscissa $X^{i}$. This determination is made from the minimum $T_{Vmin}(X)$ and maximum $T_{Vmax}(X)$ time-of-passage profiles and by a second iterative computation, i being incremented from 1 to n. The computation is, in this case, propagated from the current position of the aircraft to the last constraint $\text{RTA}^{n}$. The second iterative computation is performed in the same spirit as the first iterative computation and is initialised at the current position of the aircraft $P_{cour}$.

The second iterative computation comprises a substep 382 of determining a possible interval $\text{ETAp}^{i}$ of index i of possible estimated times of passage of the aircraft at the curvilinear abscissa $X^{i}$ by flying according to a speed profile lying between the minimum $V_{min}$ and maximum $V_{max}$ speed profiles observing a constrained estimation interval $\text{ETAc}^{i-1}$ determined:

from the current position of the aircraft $P_{cour}$ for the iteration of index 1: the computation of $\text{ETAp}^{1}$ is performed from $P_{cour}$, on the preceding iteration for an iteration of index lying between 2 and n: the computation of $\text{ETAp}^{i}$ is performed from $\text{ETAc}^{i-1}$.

Then, a substep 384 determines a constrained estimation interval $\text{ETAc}^{i}$ of index i from the intersection of the time constraint $\text{RTA}^{i}$ and of the possible interval $\text{ETAp}^{i}$ of index i.

Preferentially, the constrained estimation interval is equal to the intersection between the time constraint and the possible interval:

$$\text{ETA}_{c}^{i}=\text{RTA}^{i}\cap\text{ETA}_{p}^{i}$$

During the second iterative computation, the intersection $\text{RTA}^{i}\cap\text{ETA}_{p}^{i}$, when it exists, serves as a basis for defining a new interval called constrained estimation interval $\text{ETA}_{c}^{i}$ which corresponds to the time constraint $\text{RTA}^{i}$ reduced to be makeable with the constraint $\text{RTA}^{i-1}$.

During the second iterative computation, when all the intersections exist, a restricted estimation interval $\text{ETA}_{c}^{i}$ can be made with respect to the time constraint of index i and of all the subsequent constraints of index 1 to i−1.

Similarly, when all the constraints of indices less than i $\text{RTA}^{i-1}, \text{RTA}^{i-2}, \ldots, \text{RTA}^{1}$ can be made, that is to say that the intersections between the time constraint and the possible interval of index less than i exist (are not empty), the possible interval of index i $\text{ETAp}^{i}$ makes it possible to observe all the constrained estimated intervals of indices less than i $\text{ETA}_{c}^{i-1}, \text{ETA}_{c}^{i-2}, \ldots, \text{ETA}_{c}^{1}$ by flying according to a speed profile lying between the minimum $V_{min}$ and maximum $V_{max}$ speed profiles.

When the intersection is empty, this means that the constraint $\text{RTA}^{i}$ cannot be made given the prior constraints from 1 to i−1.

Thus, during the second iterative computation, the test 385 verifies, for each i, the existence of the intersection $RTA^i \cap ETA_p^i$. If it is not empty, the computation continues; if it is empty, the step 386 identifies the corresponding time constraint $RTA^{lk}$ as constraint that cannot be made and its index lk as constraint that cannot be made index.

The step 387 then loads a second chosen constraint $RTA_2^{lk}$ determined according to a second criterion or chosen by the pilot. The objective is to load a constraint that makes it possible to minimise the unmakeable nature between the constraint lk and the prior constraints.

The second iterative computation then resumes at the constraint that cannot be made index plus 1, lk+1, from a constrained estimated interval $ETAc^{lk}$ corresponding to the second loaded chosen time constraint $RTA_2^{lk}$.

Thus, the computation is restarted on the basis of a constrained estimated interval $ETAc^{lk}=RTA_2^{lk}$ that makes it possible to minimise the unmakeable nature of the constraint lk relative to the preceding constraints.

Thus, once the second iterative computation is completed, the method 300 according to the invention according to a first embodiment has either computed a constrained estimated interval $ETA_c^n$ that makes it possible for the aircraft to make all the constraints from its current position, or identified constraints that cannot be made and replaced them with chosen constraints, in such a way as to obtain a set of constraints that minimise their unmakeable nature, and has done so for an aircraft flying at a speed lying between $V_{min}(X)$ and $V_{max}(X)$.

The identification of the constraints that cannot be made makes it possible to report to the pilot that a subsequent constraint risks not being observed given the time and the current position of the aircraft, and its performance levels. Furthermore, the possible interval $ETA_p$ enables the pilot to propose a new makeable time constraint. In conjunction with the associated required interval $ETA_R$, he or she can propose not only a new constraint that can be made, but that is also compatible with making the subsequent constraints.

Figure 7:
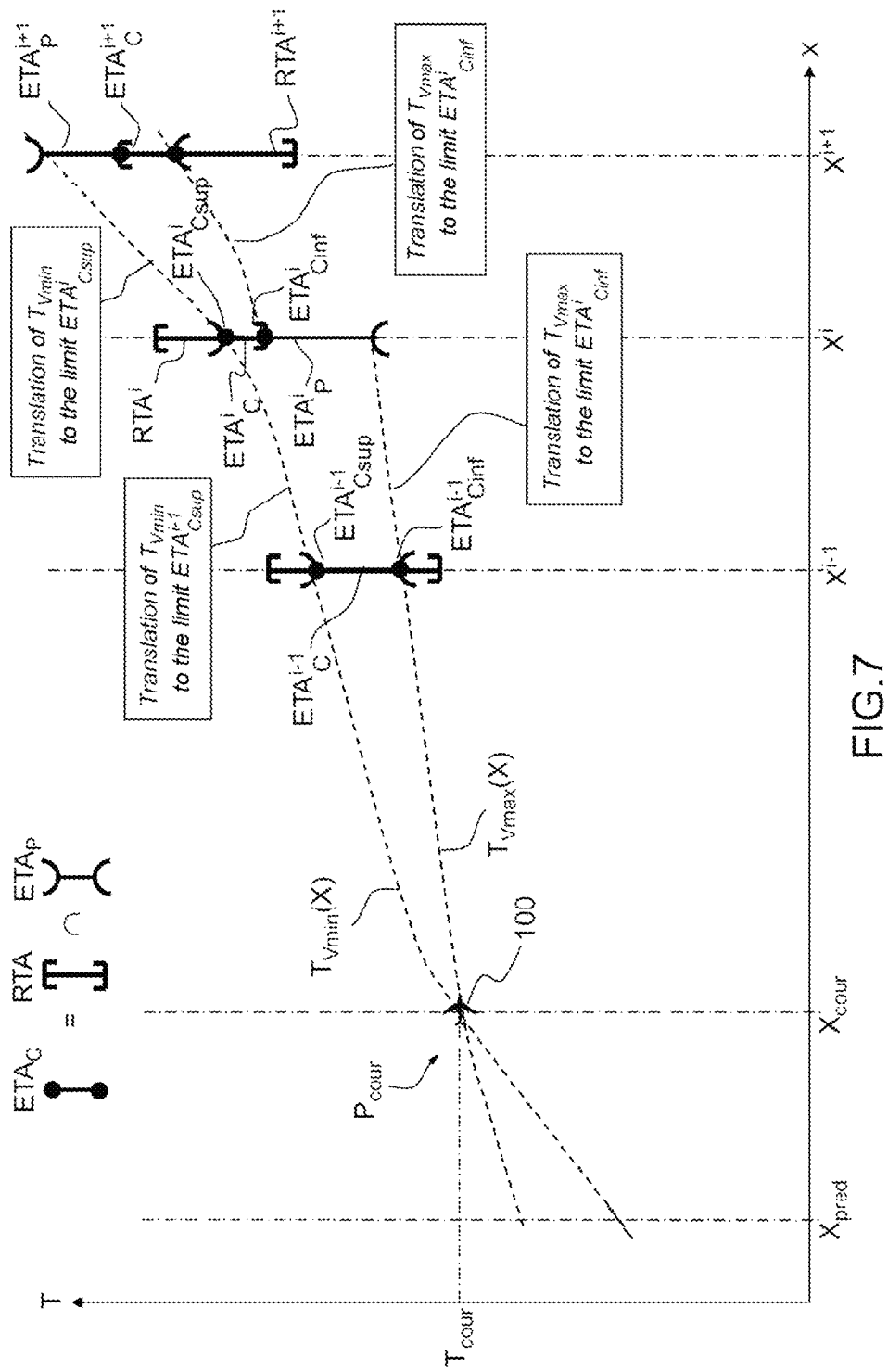
FIG. 7 illustrates a preferred method of computing the constrained estimation intervals.

To determine the constrained estimation intervals $ETA_c^i$, preferably, the method described in FIG. 7 is used, applied in a recursive manner from the current position to the last constraint of the flight plan.

The step 382 of determining the possible interval $ETAp^i$ for the index i comprises the substeps of:

performing a translation of the curve of maximum time of passage $T_{Vmax}(X)$ as a function of the curvilinear abscissa X, such that it passes through the lower limit of the constrained estimation interval of index i−1, $ETAc_{inf}^{i-1}$ of abscissa $X^{i-1}$, choosing, as lower limit $ETAp_{inf}^i$ of the possible interval $ETAp^i$, the value of said translated curve at the curvilinear abscissa $X^i$, performing a translation of the curve of minimum time of passage $T_{Vmin}(X)$ as a function of the curvilinear abscissa X such that it passes through the upper limit of the constrained estimation interval of index i−1, $ETAc_{sup}^{i-1}$, of abscissa $X^{i-1}$, choosing, as upper limit $ETAp_{sup}^i$ of the interval $ETAp^i$, the value of said translated curve at the curvilinear abscissa $X^i$.

For the step 382, for i=1:

the curve of maximum time of passage $T_{Vmax}(X)$ as a function of the curvilinear abscissa X is translated, such that it passes through $T_{cour}$, and the value of said translated curve at the curvilinear abscissa $X^1$ is chosen as lower $ETAp_{inf}^1$ of the possible interval $ETAp^1$, the curve of minimum time of passage $T_{Vmin}(X)$ as a function of the curvilinear abscissa X is translated, such that it passes through $T_{cour}$, and the value of said translated curve at the curvilinear abscissa $X^1$ is chosen as upper limit $ETA_{psup}^1$ of the possible interval $ETA_p^1$.

In other words, for an index i, from $ETA_c^{i-1}$ and from the curves $T_{Vmin}(X)$ $T_{Vmax}(X)$, $ETA_p^i$ is determined according to the following formulae:

Lower limit of estimation of possible times of passage at $RTA^{(i)}$ given the preceding constraints by flying at Vmax:

$$ETA_{p\,inf}^i = T_{Vmax}(X^i) + ETA_{c\,inf}^{i-1} - T_{Vmax}(X^{i-1})$$

Upper limit of estimation of possible times of passage at $RTA^{(i)}$ given the preceding constraints by flying at Vmin:

$$ETA_{p\,sup}^i = T_{Vmin}(X^i) + ETA_{c\,sup}^{i-1} - T_{Vmin}(X^{i-1})$$

On each iteration, the times of passage are constrained by the interval $RTA^{(i)}$ for computing the subsequent constrained times of arrival:

Lower limit of estimation of constrained time of arrival at $RTA^{(i)}$ given the preceding constraints and the current constraint by flying at Vmax:

$$ETA_{c\,inf}^i = \max\{ETA_{p\,inf}^i; RTA_{inf}^i\}$$

Upper limit of estimation of constrained time of arrival at $RTA^{(i)}$ given the preceding constraints and the current constraint by flying at Vmin:

$$ETA_{c\,sup}^i = \min\{ETA_{p\,sup}^i; RTA_{sup}^i\}$$

If the interval $RTA^i \cap ETA_p^i$ is empty for i=lk, then the constraint cannot be made given the current position of the aircraft. The deviation between the possible interval $ETA_p^{lk}$ and the constraint $RTA^{lk}$ provides an indication of the minimum error in making the constraint, and the required modification of the constraint to make it compatible with the preceding constraints and the current position of the aircraft.

Figure 8:
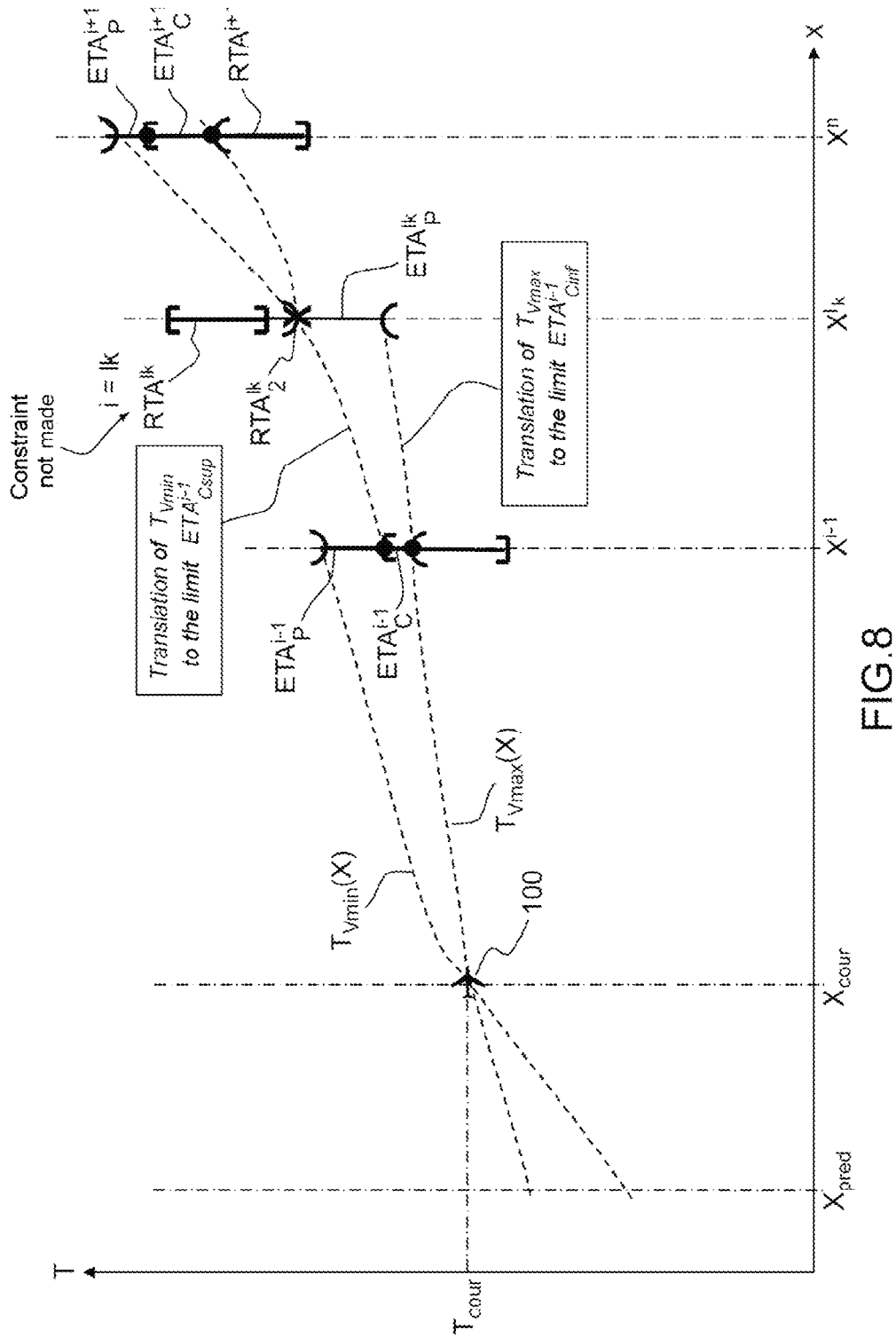
FIG. 8 illustrates a preferred second criterion mode.

According to a preferred variant illustrated in FIG. 8, when the interval is empty for i=lk, the second criterion corresponds to choosing, as second chosen time constraint $RTA_2^{lk}$, the limit of the constrained estimation interval $ETA_p^{lk}$ closest to the interval $RTA^{lk}$.

Moreover, the possible $ETAp$ closest to $RTA^{lk}$ determines the minimum modification $\Delta_{ten}^i$ of the constraint $RTA^{lk}$ that makes it possible to make this constraint makeable given the preceding constraints. This information is useful to the pilot and can guide him or her in subsequently modifying/inserting a constraint.

In addition, the deviation between the closest ETAp and the restricted interval $RTA_R^{lk}$ gives the pilot an indication of the minimum modification required, on one or more of the subsequent constraints, to re-establish the capacity to make all the constraints given the current position of the aircraft, the current time, and the preceding constraints.

In this way, the priority is placed on taking into account the current position of the aircraft to determine the time intervals that are flyable/possible at each constraint. Furthermore, the pilot has all the information necessary to propose the best adjustment of the unmakeable time constraint.

The computations of time profiles at minimum or maximum speed rely on a set of assumptions on the state of the aeroplane, its performance, or the environment. The uncertainties on these assumptions, and in particular the state of the atmosphere (wind and temperature) over all of the flight plan, can generate incorrect predictions with respect to what will be actually flyable/possible, and ultimately flown. To give an account of these uncertainties, it is possible to introduce robustness margins:

either on the profiles $T_{Vmin}/T_{Vmax}$ themselves, as a function of the distance and the flight time between the current position of the aeroplane and the predicted position, or on the intervals computed using these profiles.

By virtue of these margins, the required time intervals and the possible intervals can have a guaranteed level of reliability given the levels of uncertainty taken into account.

Figure 9:
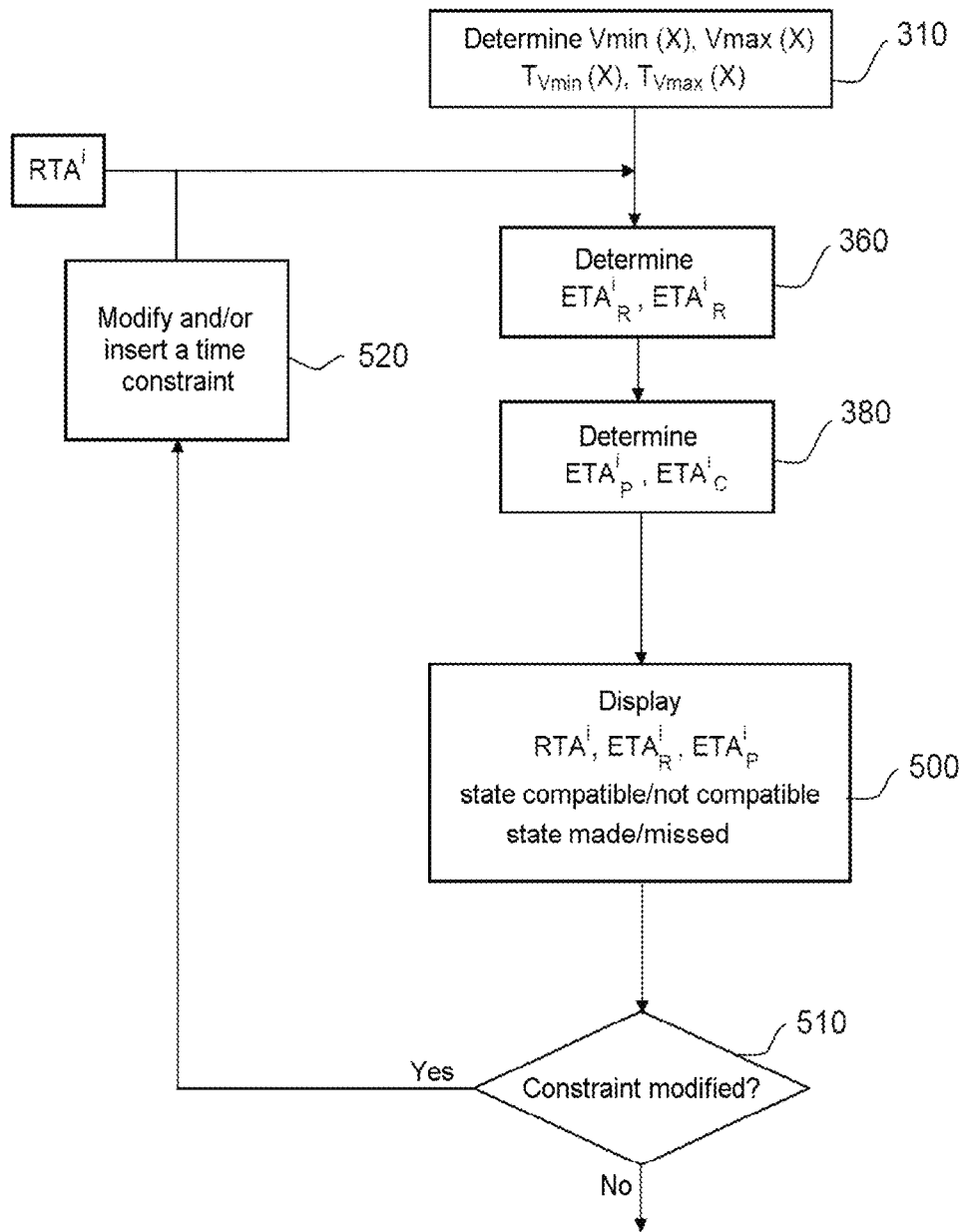
FIG. 9 describes a preferred variant of the method according to the invention.

According to a preferred variant illustrated in FIG. 9, the first iterative computation having been completed, the method according to the invention further comprising a step 500 consisting in graphically displaying time constraints $RTA^i$, corresponding required intervals $ETA_R^i$, and a compatible or incompatible state for each constraint displayed $RTA^i$.

As a variant, the second iterative computation having been completed, the display step 500 displays, in addition, for each constraint displayed $RTA^i$, corresponding possible intervals $ETA_p^i$, and a makeable or unmakeable state.

Figure 10:
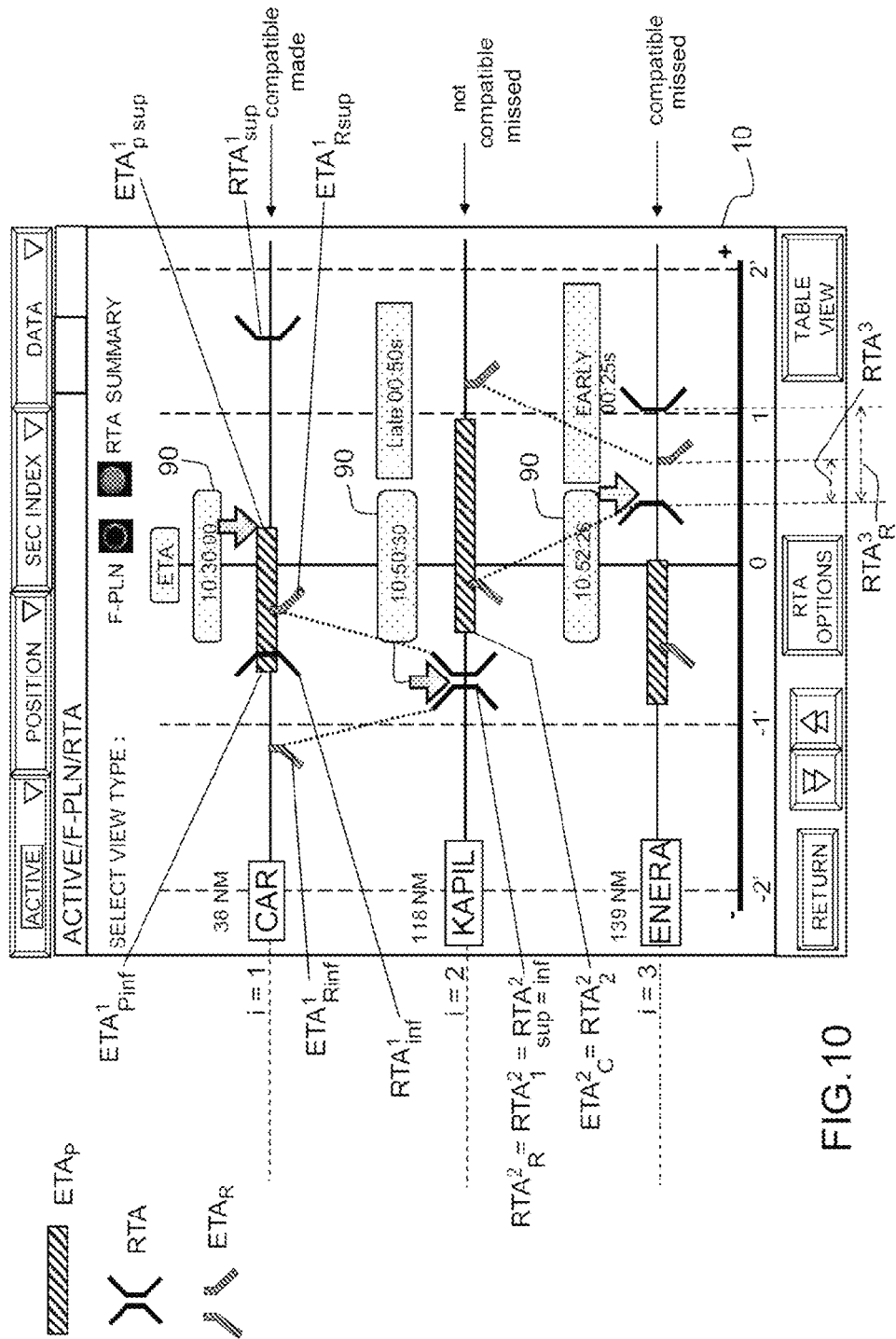
FIG. 10 describes an exemplary display of data obtained from the method according to the invention.

An exemplary display is illustrated in FIG. 10.

The time constraints RTA are displayed for l=1, 2, 3 for the respective waypoints CAR, KAPIL and ENERA of the flight plan of the aircraft.

The time constraints $RTA^i$ are symbolised by black spurs, the required time-of-passage intervals $ETA_R$ by shaded spurs and the possible time-of-passage intervals $ETAp^i$ by shaded horizontal bars.

The pilot can easily visually determine:

the intersection of the RTAs with the intervals $ETA_R$ to perceive the interval $RTA_R$, and the intersection of the RTAs with the possible intervals ETAp to perceive the intervals ETAc, and the various deviations $\Delta_{comp}^i$ (between the respective limits of the RTAs and of the $ETA_R$), $\Delta_{ten}^i$ (between the respective limits of the RTAs and $ETA_p$), and modifications to be made to improve the situation.

The pilot thus has a very comprehensive indication of the compatibility/makeable nature of the constraints of his or her flight plan: these indications are displayed graphically to the pilot in the form of segments and of symbols representing the interval of the constraint, the required interval and the interval that is possible/flyable by the aircraft.

For each of the constraints, the pilot has an indication:

that the constraint can be made, when the possible (flyable) interval is not empty otherwise, the error in making the constraint that the constraint is compatible, when the restricted interval is not empty otherwise, the constraint interval required to ensure compatibility with the subsequent constraints.

Additional indications are:

time interval required to ensure compatibility with the subsequent constraints, possible (flyable) time interval to the constraint, taking into account the preceding constraints.

This display constitutes an aid to the very important decision for the pilot, relying on the required time intervals and the possible (flyable) time intervals for each constraint.

The compatibility between each constraint and the subsequent constraints is identified and displayed to the pilot to enable a decision to be taken in 510 concerning the constraints to be modified or relaxed.

According to a variant, the method also comprises a step 520 of modifying or inserting at least one constraint to which the flight plan is subject, by the pilot and after a first display, that is to say once the two iterative computations have been completed (illustrated in FIG. 9).

In effect, the information displayed makes it possible to guide the input or the modification of a constraint, as well as the adjustment of the desired times of passage at the constraints. The indication of the possible (flyable) times of passage also enables the pilot to monitor making the time constraints during the flight, with an update during the flight not requiring any systematic recomputation of all the predictions.

The indications of the unmakeable, or non-compatible, constraints, enable the pilot to rapidly inform control on the ground or the operational centre that the constraints will not be able to be satisfied according to the desired scheduling. The display of the possible and required intervals enables the pilot to easily propose or accept adjustments of these time constraints in such a way as to rapidly obtain a new scheduling compatible with the current capabilities of the aircraft.

These indications do not require any explicit computation of a time profile making it possible to satisfy all the constraints, and can therefore be supplied without excessive computation load, and in a highly reactive manner.

The subsequent computation of the time profile is made more effective on the basis of a set of restricted constraints best ensuring that all the time constraints are made.

The first iterative computation computing required intervals and restricted intervals having been completed, according to a second embodiment, the method further comprises a step 700 consisting in determining a speed strategy and a step 800 consisting in determining a speed setpoint V(X) from the computed required intervals. Examples of speed strategies are presented later.

Figure 11:
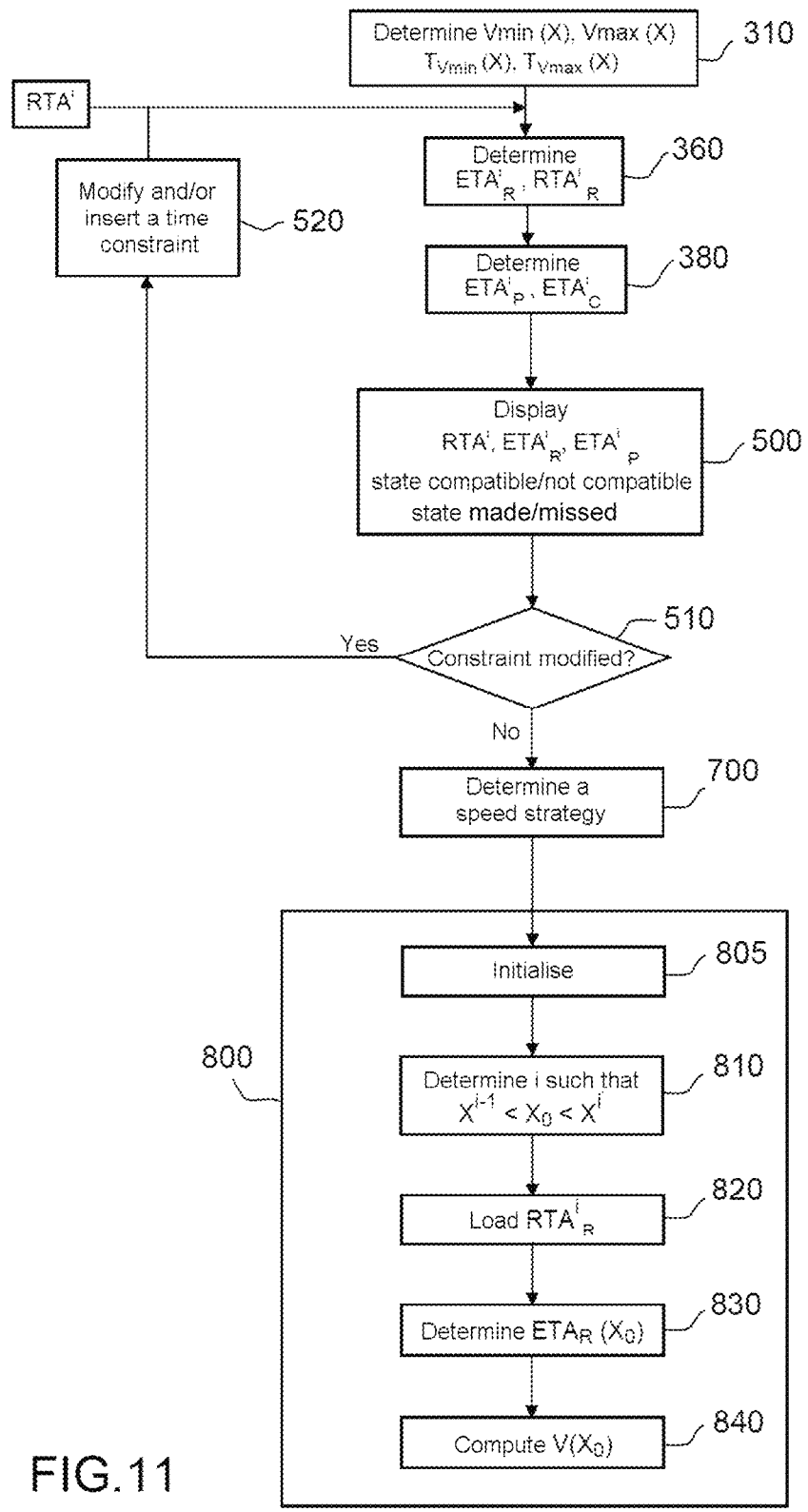
FIG. 11 schematically represents the steps of the method according to a third embodiment.
Figure 12:
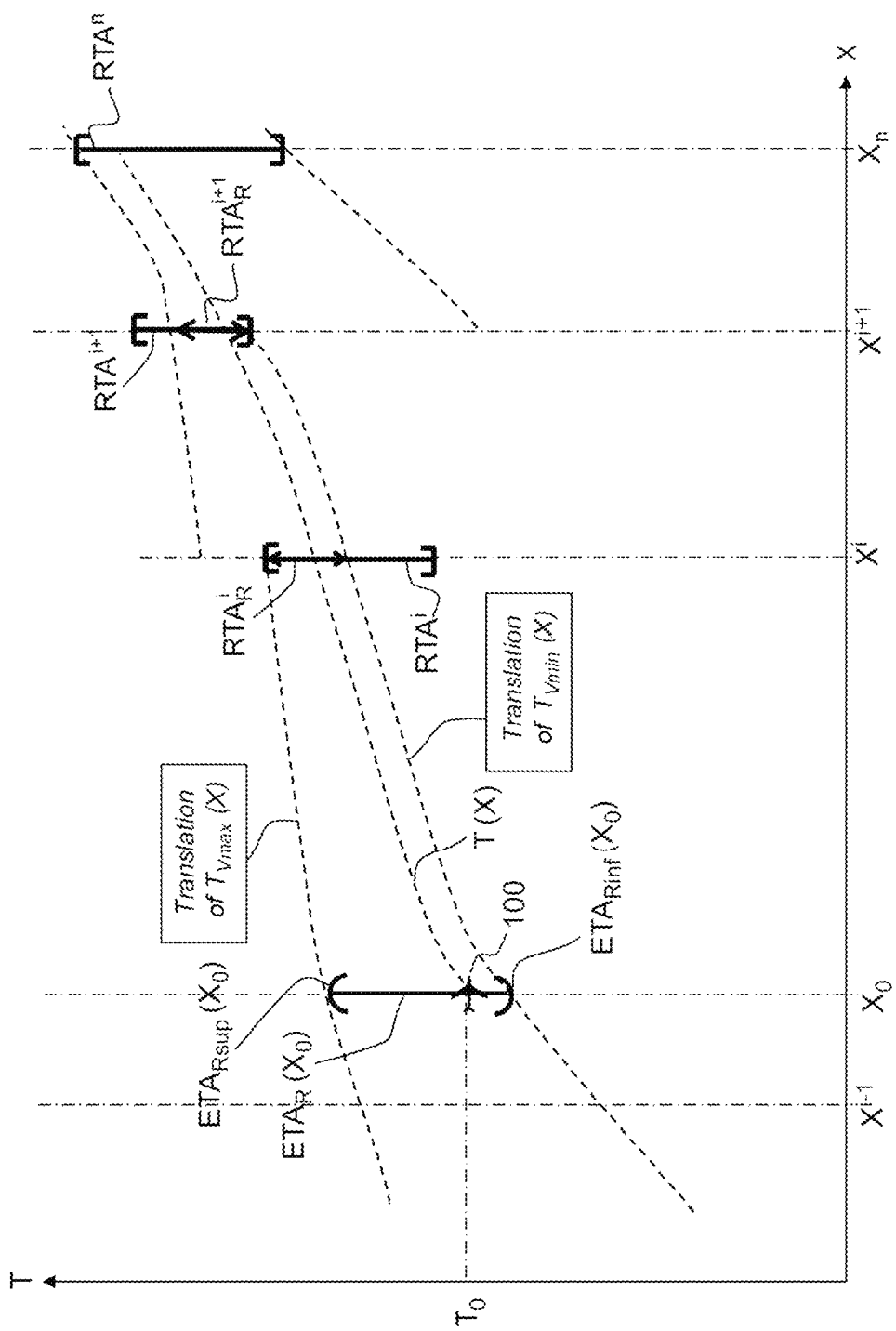
FIG. 12 illustrates a method of computing a speed profile by the method according to the invention.
Figure 13:
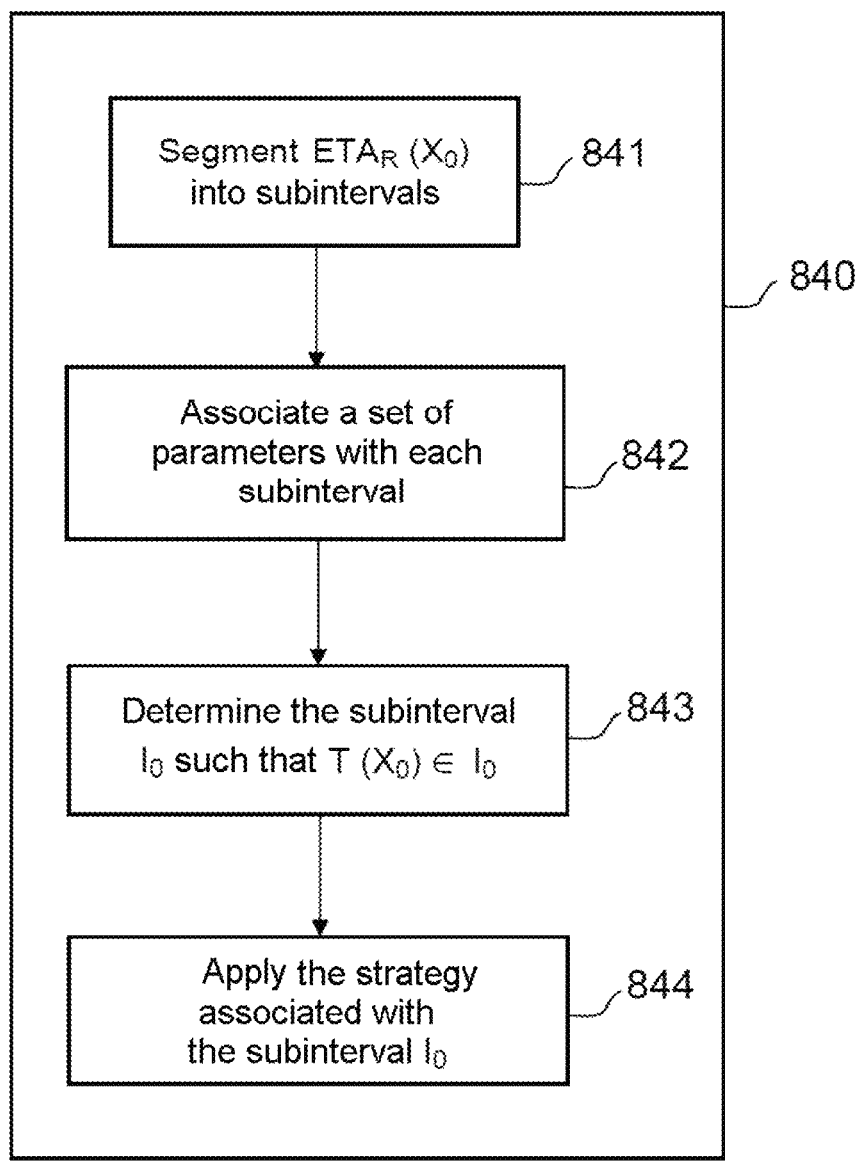
FIG. 13 schematically represents the steps of the method according to a variant of the third embodiment making it possible to implement a speed strategy.

The steps of the method according to the third embodiment of the invention are schematically represented in FIG. 11 and the method is illustrated in FIG. 12.

The speed setpoint is determined for values of X from the current position $X_{cour}$.

The step 800 of determining the speed setpoint comprises the following substeps:

A step 805 initialises the computation $X_0 = X_{cour}$.

Then, a step 810 determines, for X increasing from $X_0$ to $X^n$, the two successive constraints $X^{i-1}$ and $X^i$ of respective indices i−1 and i such that:

$X_0 \in [X^{i-1}; X^{i-1}]$. The aim is to locate the position $X_0$ relative to the abscissae $X^i$ of the time constraints RTA'. The constraint denoted i is the next constraint according to X.

A step 820 loads the restricted interval $RTA_R^i$ of index i computed in the step 360. In the step 360, from a constrained interval $RTA_R^i$ of index i, an associated required interval $ETA_R(X)$ is computed at the abscissa $X^{i-1}$ of the constraint $X^{i-1}$.

In the computation, in the step 830, the interval required at the abscissa $X_0$ is determined for which the speed setpoint $V(X_0)$ is computed.

In a step 840, for any position $X_0$ of the aircraft at a predicted time $T(X_0)$, a speed setpoint V(X) is computed from the minimum $V_{min}(X_0)$ and maximum $V_{max}(X_0)$ speed profiles, from the associated required interval $ETA_R(X_0)$, and from the predicted time $T(X_0)$. The speed setpoint $V(X_0)$ is therefore established for a predicted time $T(X_0)$ of the aircraft at the position $X_0$. It is used as command in the dynamic equation that makes it possible to compute the predicted trajectory of the aircraft. The benefit of the intervals $ETA_R(X)$ is that they are derived from a totally independent determination of the predicted speed profile (trend of the speed of the aeroplane over time) and of the predicted time T(X), which take into account the dynamic trend of the aircraft. The speed setpoint therefore depends only on the state and the current time of the aircraft, and can therefore be applied like any command law involved in the dynamic equation of a system, and the usual trajectory computation methods can use this command to predict the trajectory of the aircraft.

For $X=X^i$, i becomes i+1, the following required interval is loaded and the computation continues from this new loaded required interval.

The loaded interval $RTA_R^i$ of index i has a lower limit $RTA_{R\ inf}^i$ and an upper limit $RTA_{R\ sup}^i$.

The associated required interval $ETA_R(X)$ has a lower limit $ETA_{R\ inf}(X)$ and an upper limit $ETA_{R\ sup}(X)$ at the abscissa X which, according to a preferred variant, are computed as follows, from the formulae (1) and (2) applied to the abscissa X:

$$ETA_{Rinf}(X)=T_{Vmin}(X)+RTA_{R\ inf}^i-T_{Vmin}(X^i)$$

$$ETA_{Rsup}(X)=T_{Vmax}(X)+RTA_{R\ sup}^i-T_{Vmax}(X^i)$$

According to a first variant, the speed setpoint is computed according to a law described in document U.S. Ser. No. 12/790,596 no longer applied to a one-off and unique RTA, but to the restricted interval $RTA_R^i$.

The required interval $ETA_R(X)$ and its limits computed from the interval $RTA_R^i$ replaces the required interval of the translation of $T_{Vmin}$ and $T_{Vmax}$ converged towards the one-off RTA, as illustrated in FIG. 2 of the document U.S. Ser. No. 12/790,596.

Thus, the speed setpoint is determined on the basis of the minimum $V_{min}(X)$ and maximum $V_{max}(X)$ speed profiles weighted by proportionality ratios between the current time $T(X)$, the upper limit $ETA_{R\ sup}(X)$ and the lower limit $ETA_{R\ inf}(X)$ of the associated required interval $ETA_R(X)$ at the abscissa X.

According to one embodiment, the speed setpoint V(X) is determined by the relationship:

$$V(X) = \frac{(ETA_{R\ sup}(X) - ETA_{R\ inf}(X))V_{min}(X)V_{max}(X)}{(ETA_{R\ sup}(X) - T(X))V_{max}(X) - (ETA_{R\ inf}(X) - T(X))V_{min}(X)}$$

The embodiment corresponds to a simple speed strategy consisting in keeping the predicted time of the aircraft within the interval $ETA_R$ by keeping the proportionality ratio between the predicted time $T(X)$, the upper limit $ETA_{R\ sup}(X)$ and the lower limit $ETA_{R\ inf}(X)$ constant.

Furthermore, the upper and lower time profiles $ETA_{R\ sup}(X)$ and $ETA_{R\ inf}(X)$ can be established in relation to intermediate points and times, according to a speed strategy, as described hereinbelow.

This method for computing a speed setpoint presents many advantages over the methods according to the prior art.

In effect, the flight management computers (Flight Management Systems) of the prior art can take into account only a single time constraint, or, when several constraints may be entered into the flight plan, either the first is taken into account in the computation of the predictions and of the speed setpoints, or the constraints are activated in succession. Furthermore, the methods for computing these speed predictions to make an RTA rely on iterative computations, which are difficult to manage for a number of simultaneous constraints.

When the time constraint is proposed in the form of a time interval (earliest constraint, latest constraint or a combination of the two), it is impossible to exploit this flexibility to choose a time of passage at the constraint which makes it possible to make the subsequent constraints, or even optimises same.

Some recent patents, such as FR1152604 for example, propose evaluating making the successive constraints, and supplying indications to the pilot on the capacity to make them, but they do not make it possible to compute a speed profile which takes all the constraints into account, or to quantify the incompatibility between the successive constraints. Only the next constraint is processed.

Other methods described in the documents U.S. Pat. No. 6,507,782 or U.S. Pat. No. 5,408,413, propose determining a speed profile that ensures that a number of speed constraints are made. However, the computation of the speed profile relies on the time error at a given constraint, and therefore processes the constraints one by one, either by trajectory portions, or by successive activations and deactivations of the constraints. Furthermore, the adjustment of the speed profile relying on a time error at the constraint applies only to precise (one-off) constraints, and not to constrained time windows (intervals).

Furthermore, these methods determine an adjustment of the speed profile to compensate for a time error. This induces an iteration by successive adjustments, as well as an a posteriori limitation of the speed profile by the constraints of the flight envelope. The computation time is therefore dependent on the convergence of these iterations. Furthermore, since the flight envelope is applied only after the correction of the speed profile, it is difficult to anticipate the feasibility or the compatibility of the time constraints given the performance levels of the aircraft.

Currently, some flight management computers which take into account the time profiles incorporate a computation of time profiles at minimum and maximum speed, but limit the use of these profiles to the estimation of the flyability of one or more constraints. They are, on the other hand, not used to establish the speed profile or guide a speed strategy. Only the method described in the document U.S. Ser. No. 12/790,596 introduces this use for a unique and one-off time constraint, and is extended by the present method to multiple constraints in interval form.

Thus, the existing methods do not therefore make it possible to take into account overall the problem of making multiple time constraints, defined by values, or by time intervals. The computation load is significant and not very predictable because of the iterative nature of the computations. Finally, the estimation of the compatibility or of the feasibility of the time constraints is not proposed, and therefore offers few indications to the pilot concerning the possible options in case of failure to make a constraint.

The method according to the second embodiment of the invention incorporating the determination of a speed setpoint V(X) uses the determination of the time profiles at minimum $V_{min}$ and maximum $V_{max}$ speed according to a method described in the patent U.S. Ser. No. 12/790,596, these profiles being implemented according to the method according to the invention which combines these profiles from one constraint to another, to determine the intervals required to make the subsequent constraints, and deduce therefrom the restricted constraint intervals. By using these restricted intervals, a speed profile is determined between each constraint, according to various strategies, to make it possible to make all the flyable constraints. As described previously, this computation relies on the initial determination of two time profiles at minimum and maximum speed, without recourse to an iteration on the speed. A time profile at optimum speed, that is to say a speed that optimises a flight criterion, or even a preferred flight speed of the pilot, is used optionally to guide the strategies for computing the speed profile that keeps to the RTAs and is described later.

Furthermore, the method according to the invention described in FIG. 11 generates a speed setpoint which is permanently slaved to the current time of passage compared to the upper and lower time-of-passage profiles, the method requiring computations with a periodicity that makes it possible to lighten the computation load of the device implementing same, for example an FMS.

Another advantage of the invention is that it makes it possible to apply various strategies in the generation of the speed setpoint, to ensure sufficient margins for satisfying the time constraint, in particular in the case of unstable or imprecise wind, and to optimise the speed profile according to the different flight phases and/or according to the distance relative to the point at which the RTA constraint is applied. Examples of speed strategy are described below.

Figure 14:
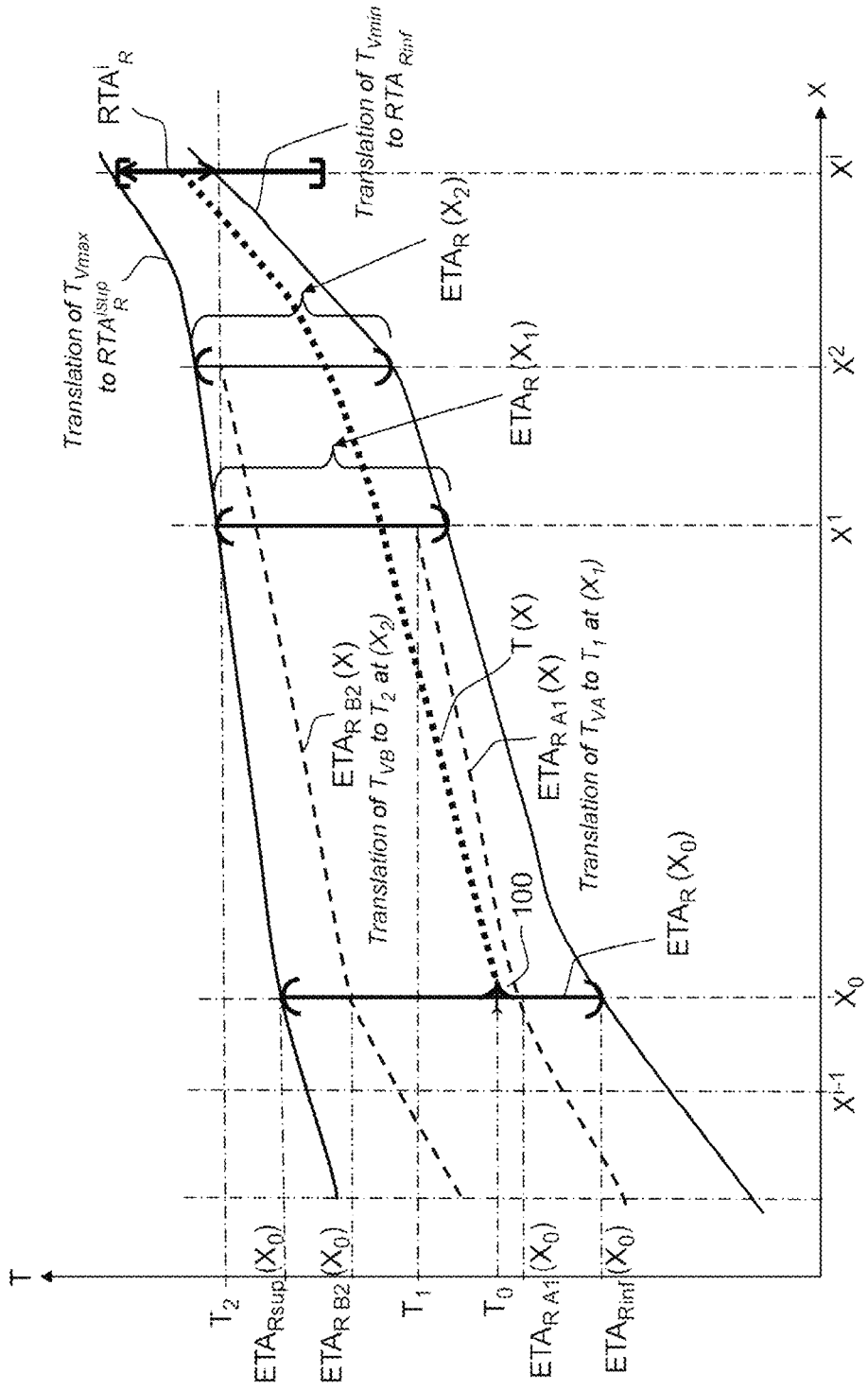
FIG. 14 illustrates a method of computing the speed profile according to the variant of the third embodiment of the invention schematically represented in FIG. 13.

According to a second variant, the computation of a speed setpoint V(X) for each interval [$X^{i-1}$, $X^i$] comprises a determination (700) of a speed strategy from a plurality of sets of parameters, a set of parameters comprising: {$V_A(X)$, $T_{VA}(X)$, $V_B(X)$, $T_{VB}(X)$, X1, X2} from which are deduced $ETA_{RA1}(X)$ and $ETA_{RB2}(X)$, these parameters being defined as follows and illustrated in FIG. 14:

$V_A(X)$: first speed profile, $T_{VA}(X)$ first time of passage resulting from the speed profile $V_A(X)$, $V_B(X)$: second speed profile, $T_{VB}(X)$ first time of passage resulting from the speed profile $V_B(X)$.

The speed profiles $V_A(X)$ and $V_B(X)$ are chosen within the flight envelope defined by the profiles $V_{min}(X)$ and $V_{max}(X)$ and satisfy the relationship: $V_{min}(X) \leq V_A(X) \leq V_B(X) \leq V_{max}(X)$ X1: first abscissa with $X_0 \leq X_1 \leq X^i$ and $T_1$ being the first reference time such that $T_1 \in ETA_R(X1)$, X2: second abscissa with $X_0 \leq X_2 \leq X^i$ and $T_2$ being the second reference time such that $T_2 \in ETA_R(X2)$, $ETA_{RA1}(X)$: lower time profile making it possible to achieve the first reference time $T_1$ corresponding to the translation of the first time of passage $T_{VA}(X)$ such that it passes through the first reference time $T_1$ at the abscissa $X_1$:

$ETA_{RA1}(X) = T_{VA}(X) + T_1 - T_{VA}(X_1)$ $ETA_{RB2}(X)$: upper time profile making it possible to achieve the second reference time $T_2$ corresponding to the translation of the second time of passage $T_{VB}(X)$ such that it passes through the second reference time $T_2$ at the abscissa $X_2$.

$ETA_{RB2}(X) = T_{VB}(X) + T_2 - T_{VB}(X_2)$

Furthermore, the step 840 of determining the speed setpoint comprises the following substeps:

a substep 841 of segmentation of the interval $ETA_R(X_0)$ into a plurality of sub-intervals according to the speed strategy, a substep 842 consisting in associating with each sub-interval a set of parameters {$V_A(X)$, $T_{VA}(X)$, $V_B(X)$, $T_{VB}(X)$, X1, X2} according to the speed strategy, a substep 843 of determination of a sub-interval $I_0$ in which the predicted time $T(X_0)$ is situated: $T(X_0) \in I_0$, a substep 844 of application of the speed strategy to the sub-interval $I_0$, consisting in computing a speed setpoint $V(X_0)$ from the set of parameters associated with the sub-intervals $I_0$. The speed strategy consists in choosing the speed setpoint $V(X_0)$ equal to $V_A(X_0)$ or $V_B(X_0)$ or to a setpoint $V_{A/B}(X_0)$ which is determined on the basis of the speed profiles $V_A(X_0)$ and $V_B(X_0)$ weighted by the proportionality ratios between the current time $T(X_0)$, the lower time profile $ETA_{RA1}(X0)$ and the upper time profile $ETA_{RB2}(X_0)$.

These speed profiles have the following meanings:

$V_A(X_0)$ consists in maintaining the speed $V_A$ until the limit $ETA_{RB2}(X)$ is reached, or up to the position $X_2$ or $X^i$ $V_B(X_0)$ consists in maintaining the speed $V_B$ until the limit $ETA_{RA1}(X)$ is reached, or up to the position $X_1$ or $X^i$ a setpoint $V_{A/B}(X_0)$ determined on the basis of the speed profiles $V_A(X_0)$ and $V_B(X_0)$ weighted by proportionality ratios between the current time $T(X_0)$, the lower time profile $ETA_{RA1}(X0)$ and the upper time profile $ETA_{RB2}(X_0)$, consists in maintaining the $T(X)$ within the interval $I_0$ with the same proportionality ratios.

According to a preferred variant, the setpoint $V_{A/B}(X_0)$ is determined by the formula:

$$V_{A/B}(X_0) = \frac{(ETA_{RB2}(X_0) - ETA_{RA1}(X_0))V_A(X_0)V_B(X_0)}{(ETA_{RB2}(X_0) - T(X_0))V_B(X_0) - (ETA_{RA1}(X_0) - T(X_0))V_A(X_0)}$$

Furthermore, different speed strategies can be envisaged to make the various $RTA^i$'s, depending on whether the aim is to:

favour flying at reduced speed (for example in climb phase to favour reaching cruising altitude)

prioritise a low-energy descent (lowest speed) so as to favour making the RTA in case of unpredicted tailwind prioritise flying at an optimum speed as long as it is compatible with making the RTAs.

For this, an optimum or preferred speed profile is introduced, called $V_{opt}(X)$, that corresponds to a speed of the aircraft computed for optimum flight conditions according to determined flight criteria or to a preferred speed of the pilot, and not taking into account the plurality of constraints $RTA^i$.

Thus, according to a variant, the first speed profile $V_A(X)$ or the second speed profile $V_B(X)$ is equal to the preferred speed profile $V_{opt}(X)$.

It is then possible to rely on the time profiles $T_{Vmin}(X)$, $T_{Vmax}(X)$ and $T_{Vopt}(X)$, respectively designating the flight time predictions at minimum, maximum or optimum speed. Depending on the desired strategy, the different definitions of the lower and upper time profiles $ETA_{RA1}(x)$ and $ETA_{R B2}(x)$ are used to determine the speed setpoint.

Figure 15:
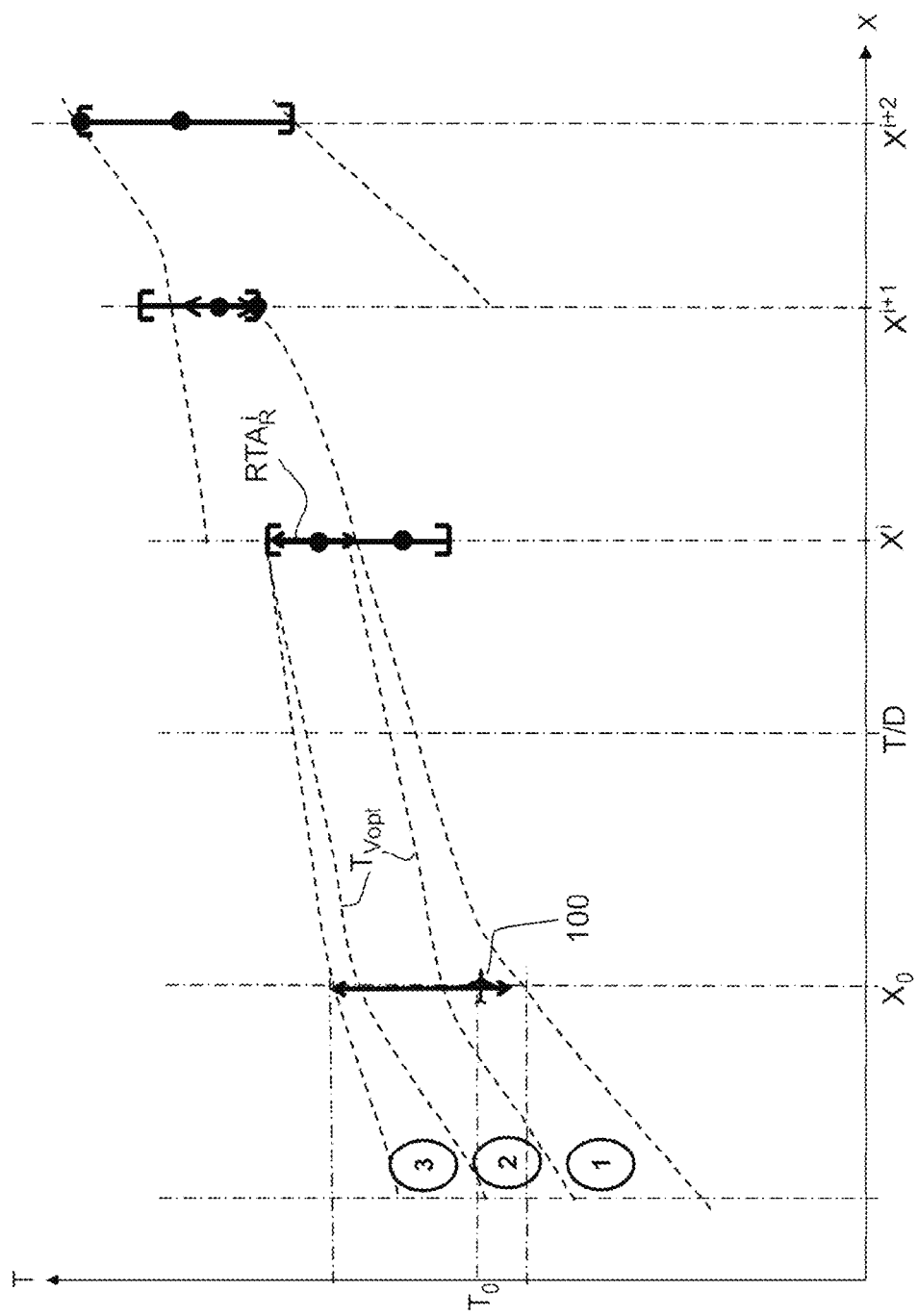
FIG. 15 describes a first exemplary speed strategy according to the invention.

According to a first example illustrated in FIG. 15, if the aim is to prioritise the use of the optimum speed, the speed strategy relies on a segmentation of $ETA_R(X_0)$ into three sub-segments defined using the speed profile $V_{opt}$, translated to the lower limit and to the upper limit of $RTA^i_R$:

If $ETA_{R\,opt\,sup} < T_0 < ETA_{R\,max\,sup}$ (interval 3) then $V(X_0)$ is equal to $V_{opt/max}$, computed with the following parameters:

$V_A = V_{opt}$, $V_B = V_{max}$, $X_1 = X_2 = X^i$, $T1 = T2 = RTA^i_{R\,sup}$, so as to pass the constraint at $RTA^{(i)}_{R\,sup}$ by accelerating as little as possible beyond $V_{opt}$, $$V_{opt/max}(X_0) = \frac{(ETA_{R\,max\,sup}(X_0) - ETA_{R\,opt\,sup}(X_0))V_{opt}(X_0)V_{max}(X_0)}{(ETA_{R\,max\,sup}(X_0) - T(X_0))V_{max}(X_0) - (ETA_{R\,opt\,sup}(X_0) - T(X_0))V_{opt}(X_0)}$$

If $ETA_{R\,opt\,inf} < T_0 < ETA_{R\,opt\,sup}$ (interval 2) then $V(X_0)$ is equal to $V_{opt}$, strategy computed with the following parameters:

$V_A=V_{opt}$, $V_B=V_{opt}$, $X_1=X_2=X^i$, $T1=RTA^i_{R\ inf}$ $T2=RTA^i_{R\ sup}$, because maintaining this speed is compatible with the next constraint and the subsequent constraints, If $ETA_{R\ min\ inf}<T_0<ETA_{R\ opt\ inf}$ (interval 1) then $V(X_0)$ is equal to $V_{min/opt}$, computed with the following parameters:

$V_A=V_{min}$, $V_B=V_{opt}$, $X_1=X_2=X^i$, $T1=T2=RTA^i_{R\ inf}$ so as to pass the constraint at $RTA^{(i)}_{R\ inf}$ by decelerating as little as possible in relation to $V_{opt}$.

$$V_{min/opt}(X_0) = \frac{(ETA_{R\ opt\ inf}(X_0) - ETA_{R\ min\ inf}(X_0))V_{min}(X_0)V_{opt}(X_0)}{(ETA_{R\ opt\ inf}(X_0) - T(X_0))V_{opt}(X_0) - (ETA_{R\ min\ inf}(X_0) - T(X_0))V_{min}(X_0)}$$

Figure 16:
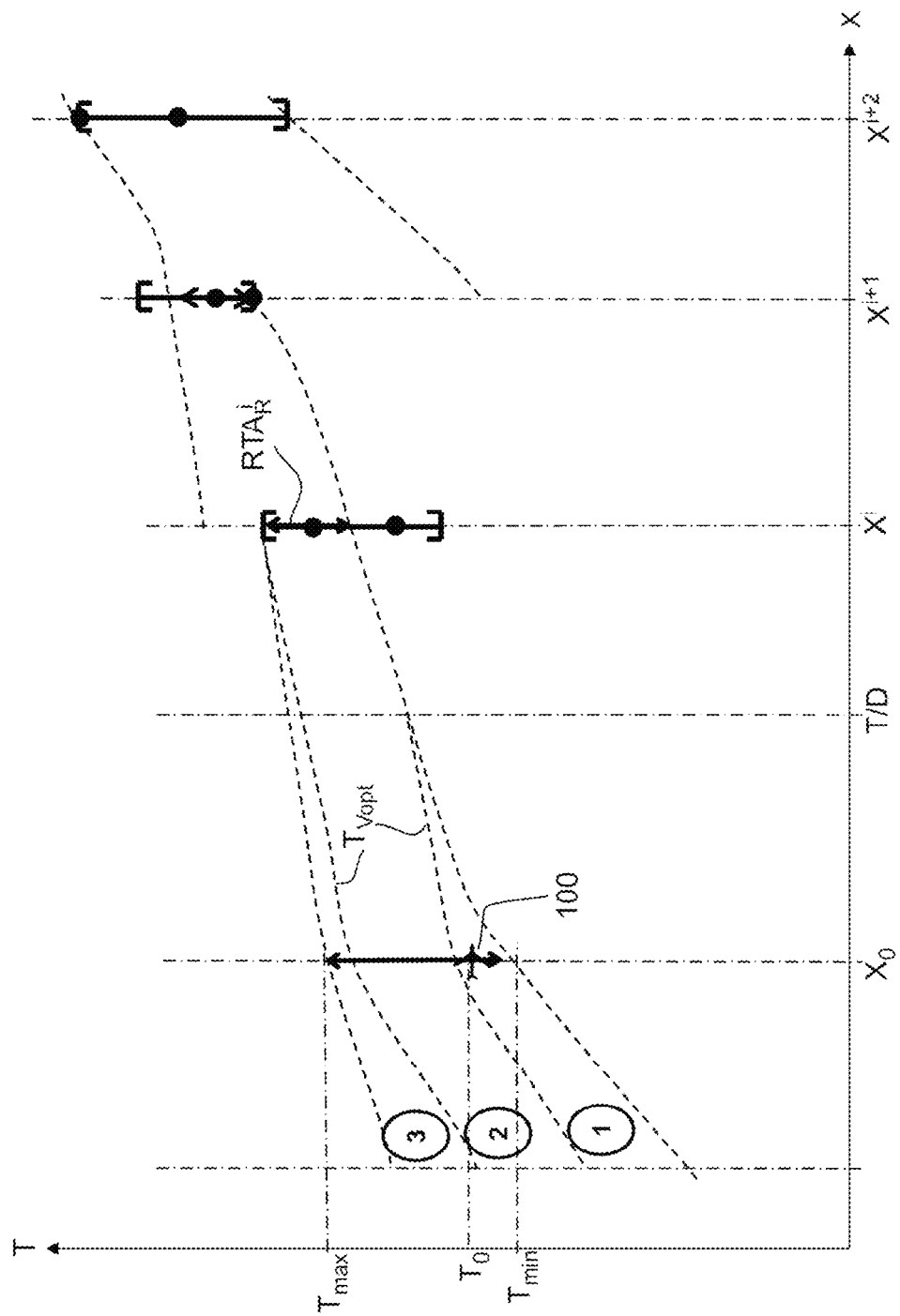
FIG. 16 describes a second exemplary speed strategy according to the invention.

FIG. 16 illustrates a second exemplary speed strategy, when cruising, and the next constraint is situated in descent. There may be a desire to arrive as early as possible at the T/D (top of descent), to favour a low-energy (low speed) descent offering a better guarantee that the next constraint will be made, acceleration being easier than deceleration in descent phase. For this, efforts are made to favour maintaining $V_{opt}$, or making the time $ETA_{R\ min\ inf}$ (T/D) at the point T/D of start of descent.

Before passing the T/D, the speed strategy relies on a segmentation of $ETA_R(X_0)$ into three sub-segments defined using the speed profile Vopt, translated on the one hand to the upper limit of $RTA^i_R$, on the other hand to the lower limit of $ETA_{R\ inf}$ (T/D) at the T/D:

If $ETA_{R\ min\ inf}<T_0<ETA_{R\ optTD\ inf}$ (interval 1) then $V(X_0)$ is equal to $V_{min/optTD}$, computed with the following parameters:

$V_A=V_{min}$, $V_B=V_{opt}$, $X_1=X^i$, $X_2=T/D$, $T1=RTA^i_{R\ inf}$, $T2=ETA_{R\ inf}(T/D)$, so as to pass the T/D at the limit $ETA_{R\ inf}$ (T/D), by decelerating as little as possible if it is not possible to make the constraint flying at $V_{opt}$.

$$V_{min/optTD}(X_0) = \frac{(ETA_{R\ optTD\ inf}(X_0) - ETA_{R\ min\ inf}(X_0))V_{min}(X_0)V_{opt}(X_0)}{(ETA_{R\ optTD\ inf}(X_0) - T(X_0))V_{opt}(X_0) - (ETA_{R\ min\ inf}(X_0) - T(X_0))V_{min}(X_0)}$$

If $ETA_{R\ optTD\ inf}<T_0<ETA_{R\ opt\ sup}$ (interval 2) then $V(X_0)$ is equal to $V_{opt}$, strategy computed with the following parameters:

$V_A=V_{opt}$, $V_B=V_{opt}$, $X_1=T/D$, $X_2=X^i$, $T1=ETA_{R\ inf}$ (T/D), $T2=RTA^i_{R\ sup}$, because maintaining the speed up to T/D is compatible with the next constraint and the subsequent constraints, If $ETA_{R\ opt\ sup}<T_0<ETA_{R\ max\ sup}$ (interval 3) then $V(X_0)$ is equal to $V_{max}$, strategy computed with the following parameters:

$V_A=V_{opt}$, $V_B=V_{max}$, $X_1=X_2=X^i$, $T1=T2=RTA^i_{R\ sup}$, so as to regain the speed margin by flying at $V_{max}$ if it is too late to make the next constraint by flying at $V_{opt}$.

Once past the point T/D of start of descent, the speed strategy can be applied in accordance with FIG. 15.

As indicated above, it is possible to introduce robustness margins:

Either on the profiles $T_{Vmin}/T_{Vmax}$ themselves, as a function of the distance and the flight time between the current position of the aeroplane and the predicted position.

Or on the intervals calculated using these profiles.

By virtue of these margins, the required time intervals and the possible intervals can have a guaranteed level of reliability given the levels of uncertainty taken into account.

These intervals made reliable make it possible to determine more robust speed profiles, and to provide the pilot with a better understanding of the situation to assist in his or her navigation decisions.

The implementation of the method determining a speed setpoint further allows for a simplified update. Having determined a speed profile to make the different constraints RTA, the aircraft will be confronted with different atmospheric conditions from those predicted. The time of passage flown along the trajectory will therefore differ from the predicted time, and the difference may compromise making certain constraints.

The method according to the invention makes it possible to update the speed setpoint without having to recompute the predictions, since the speed setpoint is determined at any point as a function of the time profiles $V_{min}$ and $V_{max}$, of the position and of the current time of the aircraft, of the time interval required on the next constraint, according to the chosen speed strategy. Furthermore, the flyable time profiles can be updated also without recomputing the predictions, by taking into account the trend of the current position and date.

The method according to the invention thus makes it possible to continuously adapt the speed setpoint and monitor the making of the constraints, according to the actual conditions encountered during the flight. The decision to recompute the predictions can be taken on a periodic basis, or according to a tolerance defined on the deviation between the current time and the predicted time, or on a tolerance on the trend of the flyable interval relative to the time interval required on a constraint.

The recomputation of the minimum and maximum speed profiles is done periodically at a low rate (typically every minute) or upon the modification of assumptions for computing this profile (modification of the flight plan, modification of the constraints, modification of the wind assumptions).

Figure 17:
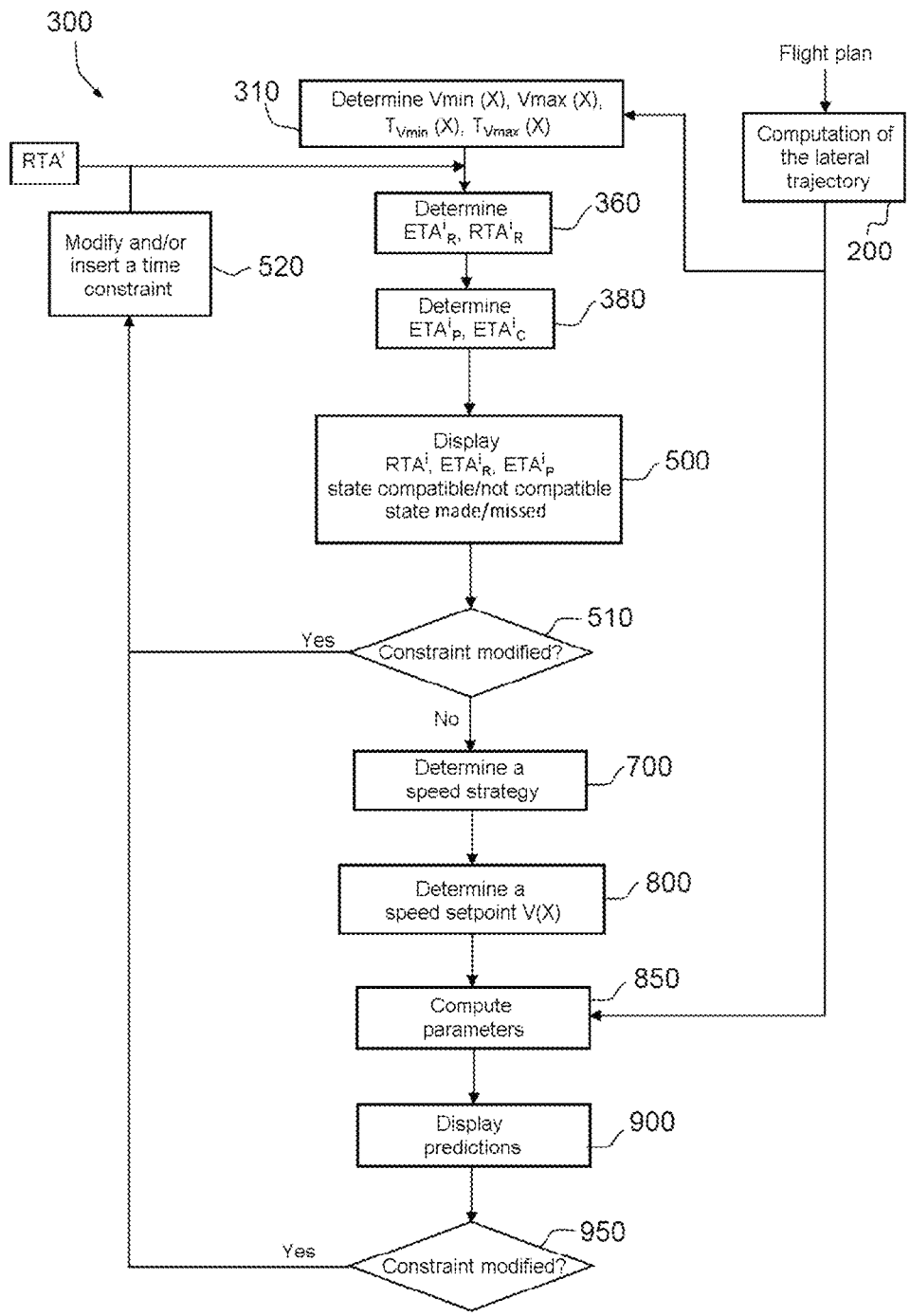
FIG. 17 illustrates a variant of the method according to the invention incorporated in a flight management system.

FIG. 17 illustrates a variant of the method 300 according to the invention incorporated in a flight management system.

The method comprises a preliminary step 200 consisting in computing a lateral trajectory of the aircraft from the flight plan.

The trend of the flight parameters of the aeroplane along the lateral trajectory is computed by taking into account the flight model of the aeroplane, and the speed setpoint determined in the step 800 as a function of the time and of the position along the trajectory. The prior art offers performance models and dynamic equations of variable complexity, which make it possible to determine the trend of the aircraft state parameters, as a function of this same state, of the current time, and of control parameters. The methods of the art for establishing the trend of the parameters from these equations are also varied, whether based on digital integration or optimisation. The determination of the speed setpoint according to the step 800 makes it possible to define the relationship between the position and the current time along the trajectory, and the speed setpoint to be applied.

Predicted parameters corresponding to predictions of flight parameters, and which constitute the predicted trajectory of the aeroplane, are typically:

the predicted altitude, a major parameter of the flight model, necessary for establishing the relationship between the air speed and the ground speed, the predicted speed, the result of tracking the speed setpoint according to the step 800, but constrained by the flight performance levels and the acceleration limits of the aircraft, the predicted weight of the aircraft, a parameter that is necessary to the flight model, and which gives the pilot an indication of the consumption of the aircraft, optimised by the chosen speed strategies, the predicted time of passage $T(X^i)$, the conformity of which to the constraints $RTA^i$ makes it possible to establish the "missed/made" of the constraint, in terms of predicted time and not according to the scheduling of the intervals as in the computation of the constrained estimation intervals described above.

The constraint made or missed criterion, which is based on the predicted time $T(X^i)$, can differ from the makeable nature of the constraint determined on the basis of the constrained estimation intervals described above. In effect, these concepts are in principle consistent, but can differ depending on the robustness margins which will have been applied in the computation of the intervals, on the one hand, and in the computation of the speed setpoints on the other hand.

In a display step 900, predicted parameters are displayed for each displayed constraint $RTA^i$ such as:

the predicted time of passage $T(X^i)$ illustrated under the reference 90 in FIG. 10, and/or the corresponding percentage of the constraint interval, the "missed/made" status of the constraint, the deviations from the constraint "RTA error".

These parameters enable the pilot to check that constraints are made (in terms of predicted times, and not of interval scheduling), the margin available to him or her when they are made or the required correction when they are not.

Preferentially, the display steps 500 and 900 take place on one and the same screen 10 summarising all the information useful to the pilot and computed by the method according to the invention.

At this stage, the pilot can, test 950, modify or insert a new constraint. He or she has a complete set of information on the flight, providing assistance in the decision to modify or insert any constraint.

As a variant, for any unconstrained point of the flight plan on which the pilot wants to define a new constraint, the method displays the following information:

the time interval required to ensure compatibility with the subsequent constraints, the possible/flyable time interval at the new constraint, taking into account the preceding constraints, the predicted time of passage at the new constraint.

The pilot can define a new time constraint, with earliest and latest limits, and modify the desired time of passage, if he or she wants to manually modify the strategy for making the time constraints.

As a variant, the current setpoint speed for making the constraints $RTA^i$ is displayed to the pilot on the speed scale, which also shows the minimum and maximum speeds of the flight envelope. An indication of the optimum speed can optionally be displayed on a head-down dedicated page, rather than on the speed scale.

As a variant, once the predictions have been established with the chosen speed strategy, the comparison of the fuel consumptions on the profile predicted by the method according to the invention and on the profile computed at $V_{opt}$ provides the pilot with an indication of the fuel consumption induced by the time constraints.

Thus, to sum up, the method summarised in FIG. 17 consists in:

using the predictions of the FMS (or of a BADA model or equivalent for the ground stations), in computing the predictions $T_{Vmin}$ and $T_{Vmax}$ along the trajectory corresponding to the times of passage respectively at minimum speed and maximum speed, estimating, between two successive constraints, the time-of-passage interval $ETA_R$ at the current constraint which is compatible with making the next constraint, propagating, from the last constraint to the current position of the aeroplane, these compatible time intervals to confirm that a speed profile lying between $V_{min}$ and $V_{max}$ makes it possible to make constraints, or to determine two incompatible constraints, estimating, between two successive constraints, the possible times of arrival ETAp at the next constraint, according to the possible time interval at the first constraint, propagating, from the current position of the aircraft and up to the last constraint, these possible arrival intervals to determine the constraints that can be made given the current position of the aircraft, predicting, at any point of the trajectory, the speed profile V(X) which makes it possible to make all successive constraints, or, by default, to minimise the error on the time of passage for the non-compatible constraints, providing the pilot with an indication of the making of the constraints, or, for the missed constraints, the indication of the minimum deviation given the preceding constraints, or the minimum modification of the preceding constraint(s) in order to make the constraint, providing the pilot with assistance in the decision to input a new constraint, or to adjust an existing constraint, through the indication of the required time intervals $ETA_R$ to make it possible to make the subsequent, or flyable, constraints $ETA_p$ given the previous constraints.

According to another aspect, the invention relates to a device for assisting in the navigation of an aircraft following a flight plan subject to a plurality of time constraints, the device comprising means for implementing the steps of the method according to the invention.

According to another aspect of the invention, the invention relates to a system comprising the device according to the invention.

Figure 18:
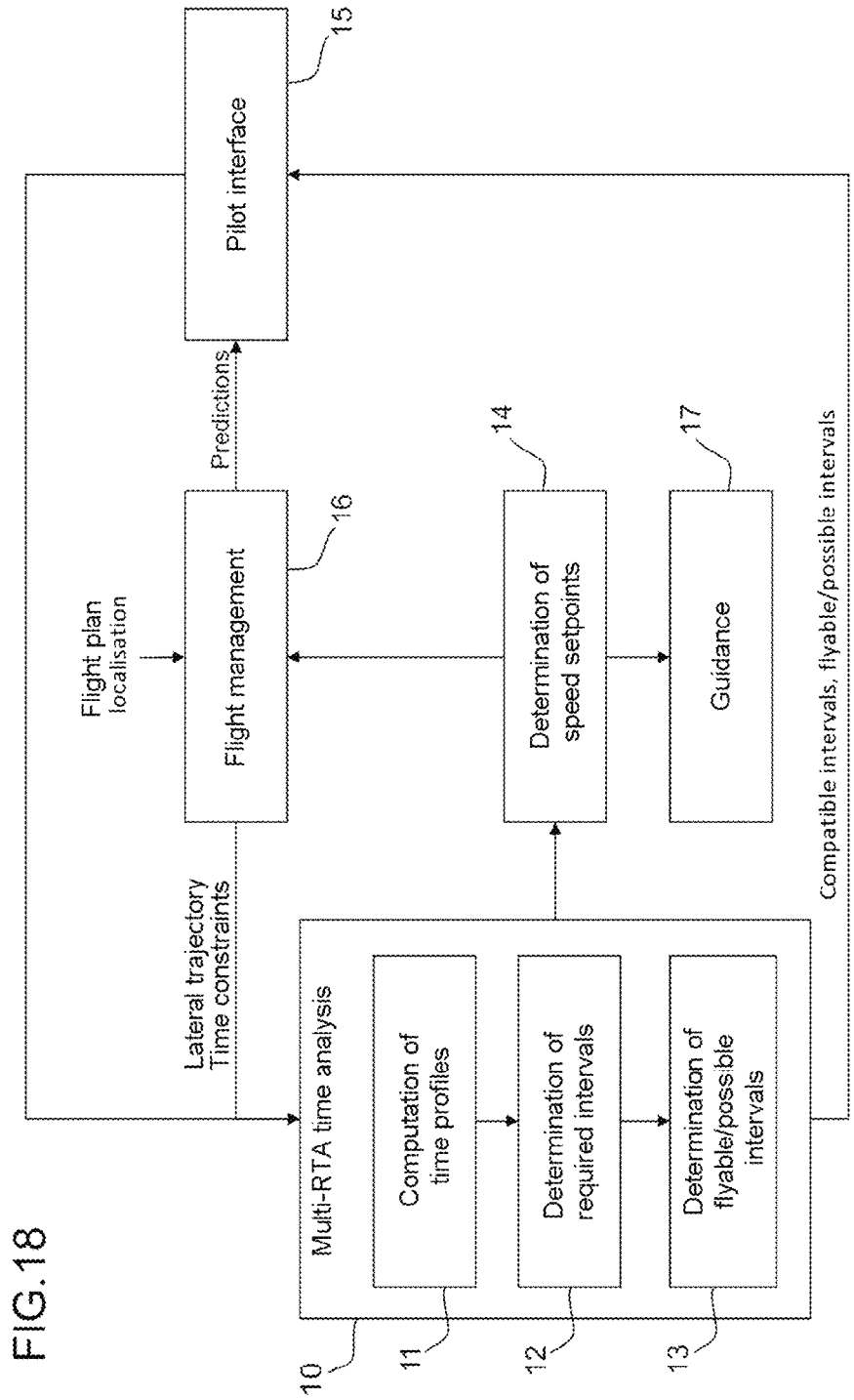
FIG. 18 describes the functional architecture of a device implementing the method.

FIG. 18 illustrates the architecture of an exemplary system comprising a device implementing the method.

A multi-RTA time analysis module 10 comprises a module 11 adapted to compute time profiles, a module 12 adapted to determine required intervals and a module 13 adapted to determine possible/flyable intervals. A module 14 is adapted to determine the speed setpoint, and is coupled to an aircraft guidance module 17.

A pilot interface 15 is adapted to typically display the time constraints, the required intervals, the possible intervals, the compatibility and the making of the constraints, the predictions, and enables the pilot to modify an existing constraint or insert a new constraint ergonomically. The flight management module 16 is adapted to compute the lateral trajectory, provides the time constraints and ensures coordination of the abovementioned different modules.

The system is, according to a first example illustrated in FIG. 18, an embedded system onboard the aircraft, linked with the navigation and flight management system, under the supervision of the crew or in a more or less automated manner. The system is a navigation aid system in the strict sense, making it possible to lock the speed of the aeroplane using the automatic pilot.

According to a second example, the system is used on the ground for mission preparation, for example the scheduling of the flights to determine the flight plan or plans of the aircraft before the flight. It makes it possible for example to ensure consistency between a plurality of scheduled flights.

According to a third example, the system is used on the ground by air traffic control, and the method is implemented to determine the required, possible times of passage, to compute the trajectory of the aeroplanes, the prediction of the flights making it possible to adjust the time constraints demanded of the aeroplanes and thus to ensure the sequencing of the traffic.

According to a fourth example, the system is used on the ground for the preparation and tracking of drone missions, making it possible to manage the flight plan and the navigation of the drone from a ground station. The different steps of the method can be divided up between the ground and the aircraft/drone.

According to another aspect, the invention relates to a computer program product comprising code instructions making it possible to perform the steps of the method according to the invention.

The invention claimed is:

1. A method for assisting in a navigation of an aircraft, executed by a mission management system, said aircraft following a flight plan subject to a plurality of time constraints $RTA^i$ indexed by an index i varying from 1 to n, the index 1 corresponding to a time constraint closest to a current position ($P^{cour}$) of the aircraft and the index n corresponding to a time constraint furthest away from the current position, the position of the aircraft on the flight plan being identified as a function of a curvilinear abscissa X, a time constraint of index i $RTA^i$ being delimited by an earliest time of passage $RTA_{inf}^i$ and a latest time of passage $RTA_{sup}^i$ and corresponding to a curvilinear abscissa $X^i$, the method comprising the steps:

determining a minimum speed profile ($V_{min}(X)$), a maximum speed profile ($V_{max}(X)$), and minimum ($T_{Vmin}(X)$) and maximum ($T_{Vmax}(X)$) times of passage for an aircraft flying respectively at the minimum ($V_{min}(X)$) and maximum ($V_{max}(X)$) speeds, as a function of the curvilinear abscissa X, said minimum and maximum speed profile being determined from at least performances and a state of the aircraft, determining, for each constraint $RTA^i$ of index i a restricted interval $RTA_R^i$ corresponding to a restricted time constraint interval and a required interval $ETA_R^i$ corresponding to a required time of passage interval for the aircraft at a waypoint $P_{RTA}^i$ of curvilinear abscissa $X^i$, said determination being made on a basis of minimum ($T_{Vmin}(X)$) and maximum ($T_{Vmax}(X)$ time-of-passage profiles and, by a first iterative computation, i being decremented from n−1 to 1 and comprising:

determining a required interval $ETA_R^i$ of index i enabling the aircraft to observe a restricted interval of index i+1 $RTA_R^{i+1}$ by flying according to a speed profile lying between the minimum ($V_{min}$) and maximum ($V_{max}$) speed profiles, said restricted interval of index i+1 $RTA_R^{i+1}$ being determined on a preceding iteration for an iteration of index lying between 1 and n−2, or from the time constraint of index n $RTA^n$ for the iteration of index n−1, determining a restricted interval $RTA_R^i$ of index i from an intersection of the time constraint $RTA^i$ and of the required interval $ETA_R^i$ of index i, a required interval of index i $ETA_R^i$ making it possible to observe all the restricted intervals of indices greater than i $RTA_R^{i+1}$, $RTA_R^{i+2}$, $RTA^n$ by flying according to a speed profile lying between the minimum ($V_{min}$) and maximum ($V_{max}$) speed profiles, when the constraints of indices greater than i $RTA^{i+1}$, $RTA^{i+2}$, ..., $RTA^n$ are mutually compatible, said method further comprising a display step graphically displaying, to a pilot or an operator, information graphically illustrating compatibility of the aircraft to comply with said time constrains $RTA^i$ based on the interval $RTA_R^i$ and the required interval $ETA_R^i$.

2. The method according to claim 1, in which said restricted interval of index i $RTA_R^i$ is equal to said intersection of the time constraint $RTA^i$ and of the required interval $ETA_R^i$ of index i.

3. The method according to claim 1, in which said restricted interval of index i $RTA_R^i$ is equal to said intersection minus a robustness margin.

4. The method according to claim 1, further comprising, when said intersection is empty during the first iterative computation, the steps:

identifying the corresponding time constraint as incompatible constraint $RTA^{jk}$ and its index as incompatible constraint index (jk), loading a first chosen time constraint $RTA_1^{jk}$ determined according to a first criterion or chosen by the pilot and, resuming said first iterative computation at the incompatible constraint index minus 1 (jk−1) and from a restricted interval $RTA_R^{jk}$ corresponding to said loaded first chosen time constraint $RTA_1^{jk}$.

5. The method according to claim 4, in which said first criterion corresponds to choosing, as first chosen time constraint $RTA_1^{jk}$, the limit of the time constraint $RTA^{jk}$ of incompatible constraint index (jk) closest to said required interval $ETA_R^{jk}$ of incompatible constraint index (jk).

6. The method according to claim 1, in which the step of determining the required interval $ETA_R^i$ of index i comprises the substeps:

performing a translation of the curve of maximum time of passage as a function of the curvilinear abscissa X ($T_{Vmax}(X)$) such that it passes through the upper limit $RTA_{Rsup}^{i+1}$ of the restricted interval of index i+1 $RTA_R^{i+1}$ of abscissa $X^{i+1}$, choosing, as upper limit $ETA_{Rsup}^i$ of said required interval $ETA_R^i$, the value of said curve translated to the curvilinear abscissa $X^i$, performing a translation of the curve of minimum time of passage as a function of the curvilinear abscissa X ($T_{Vmin}(X)$) such that it passes through the lower limit $RTA_{Rinf}^{j+1}$ of the restricted interval of index i+1 $RTA_R^{i+1}$ of abscissa $X^{i+1}$, choosing, as lower limit $ETA_{Rinf}^i$ of the required interval $ETA_R^i$, the value of said curve translated to the curvilinear abscissa $X^i$.

7. The method according to claim 1, further comprising a step of computation of a required interval $ETA_R(X_{cour})$, at the current position of the aircraft ($X_{cour}$), from the restricted interval of index 1 $RTA_R^1$.

8. The method according to claim 1, further comprising the step of determining, for each constraint $RTA^i$ of index i, a constrained estimation interval $ETAc^i$ corresponding to an estimated interval of constrained time of arrival of the aircraft at the waypoint $P_{RTA}^i$ of curvilinear abscissa $X^i$ and a possible interval $ETAp^i$ corresponding to an interval of the possible estimated times of passage of the aircraft at the waypoint $P_{RTA}{}^i$ of curvilinear abscissa $X^i$, said determination being made from minimum ($T_{Vmin}(X)$) and maximum ($T_{Vmax}(X)$) time-of-passage profiles and by a second iterative computation, i being incremented from 1 to n, and comprising:

determining a possible interval $ETAp^i$ of index i of possible estimated times of passage of the aircraft at the curvilinear abscissa $X^i$ by flying according to a speed profile lying between the minimum ($V_{min}$) and maximum ($V_{max}$) speed profiles and observing a constrained estimation interval $ETAc^{i-1}$ determined on the preceding iteration for an iteration of index lying between 2 and n, or from the current position of the aircraft ($P_{cour}$) for the iteration of index 1, determining a constrained estimation interval $ETAc^i$ of index i from the intersection of the time constraint $RTA^i$ and of the possible interval $ETAp^i$ of index i, during the second iterative computation, when said intersection is empty:

identifying the corresponding time constraint as unmakeable constraint $RTA^{lk}$ and its index as unmakeable constraint index lk, loading a chosen second constraint $RTA_2{}^{lk}$ determined according to a second criterion or chosen by the pilot and, resuming said second iterative computation at the unmakeable constraint index plus 1 (lk+1) and from a constrained estimation interval $ETA_c{}^{lk}$ corresponding to the loaded chosen second constraint $RTA_2{}^{lk}$, a possible interval of index i $ETAp^i$ making it possible to observe all the constrained estimation intervals of index less than i $ETA_c{}^{i-1}$, $ETA_c{}^{i-2}$, ..., $ETA_c{}^1$ by flying according to a speed profile lying between the minimum ($V_{min}$) and maximum ($V_{max}$) speed profiles, when all the constraints of indices less than i $RTA^{i-1}$, $RTA^{i-2}$, ..., $RTA^1$ can be made.

9. The method according to claim 8, in which said second criterion corresponds to choosing, as second chosen time constraint $RTA_2{}^{lk}$, the limit of the possible interval $ETAp^{lk}$ of unmakeable constraint index (lk) closest to the time constraint $RTA^{lk}$ of unmakeable constraint index (lk).

10. The method according to claim 8, in which the step of determining the possible interval $ETAp^i$ for the index i comprises the substeps:

performing a translation of the curve of maximum time of passage as a function of the curvilinear abscissa X ($T_{Vmax}(X)$) such that it passes through the lower limit of the constrained estimated interval of index i-1 $ETAc_{inf}{}^{i-1}$ of abscissa $X^{i-1}$, choosing, as lower limit $ETAp_{inf}{}^i$ of the possible interval $ETAp^i$, the value of said curve translated to the curvilinear abscissa $X^i$, performing a translation of the curve of minimum time of passage as a function of the curvilinear abscissa X ($T_{Vmin}(X)$) such that it passes through the upper limit of the constrained estimated interval of index i-1 $ETAc_{sup}{}^{i-1}$ of abscissa $X^{i-1}$, choosing, as upper limit $ETAp_{sup}{}^i$ of the possible interval $ETAp^i$, the value of said curve translated to the curvilinear abscissa $X^i$.

11. The method according to claim 1, in which the first iterative computation is completed, and further comprising in said display step, graphically displaying time constraints $RTA^i$, corresponding required intervals $ETA_R{}^i$, and a compatible or non-compatible state for each constraint displayed $RTA^i$.

12. The method according to claim 8, in which the second iterative computation is completed and in which the display step displays, for each displayed constraint $RTA^i$ corresponding possible intervals $ETA_p{}^i$, and a makeable or unmakeable state.

13. The method according to claim 1, further comprising a step of modifying and/or inserting at least one time constraint RTA to which the flight plan is subject.

14. The method according to claim 1, in which, said first iterative computation having been completed, and further comprising a computation of speed setpoint V(X) determined from the current abscissa of the aircraft $X_{cour}$ comprising the steps:

determining a speed strategy,
determining a speed setpoint V(X) comprising the substeps:
initialising at $X_0 = X_{cour}$
for a computation abscissa $X_0$ increasing from $X_{cour}$ to $X^n$:
determining the two successive constraints $X^{i-1}$ and $X^i$ such that:

$X_0 \in [X^{i-1}; X^i]$ loading the restricted interval $RTA_R{}^i$ of index i
determining the associated required interval $ETA_R(X)$ from the loaded restricted interval $RTA_R{}^i$,
determining a speed setpoint $V(X_0)$ from the minimum $Vmin(X_0)$ and maximum $Vmax(X_0)$ speed profiles, of associated required interval $ETA_R(X_0)$, and of a predicted time $T(X_0)$ at the computation abscissa $X_0$.

15. The method according to claim 14, in which the speed setpoint is determined on the basis of the minimum $V_{min}(X)$) and maximum $V_{max}(X)$ speed profiles weighted by proportionality ratios between the current time $T(X_0)$, the upper limit $ETA_{Rsup}(X_0)$ and the lower limit $ETA_{R\,inf}(X_0)$ of the associated required interval $ETA_R(X_0)$ at the abscissa $X_0$.

16. The method according to claim 15, in which the speed setpoint $V(X_0)$ is determined by the relationship:

$$V(X_0) = \frac{(ETA_{R\,sup}(X0) - ETA_{R\,inf}(X0))V_{min}(X0)V_{max}(X0)}{(ETA_{R\,sup}(X0) - T(X0))V_{max}(X0) - (ETA_{R\,inf}(X0) - T(X0))V_{min}(X0)}$$

$T(X_0)$ designating the predicted time,
$ETA_{R\,sup}(X_0)$ the upper limit of the required interval $ETA_R(X)$ at the abscissa $X_0$,
$ETA_{R\,inf}(X_0)$ the lower limit of the required interval $ETA_R(X)$ at the abscissa $X_0$.

17. The method according to claim 14, in which:
the step of determining a speed strategy formed from a plurality of sets of parameters, a set of parameters comprising:
a first speed profile $V_A(X)$, and a first time of passage $T_{VA}(X)$, resulting from the speed profile $V_A(X)$,
a second speed profile $V_B(X)$ and a second time of passage $T_{VB}(X)$ resulting from the speed profile $V_B(X)$,
the speeds $V_A(X)$ and $V_B(X)$ satisfying the relationship:

$V_{min}(X) \leq V_A(X) \leq V_B(X) \leq V_{max}(X)$, a first abscissa $X_1$ with $X_0 \leq X_1 \leq X^i$ and a first reference time $T_1$ such that $T_1 \in ETA_R(X_1)$,
a second abscissa $X_2$ with $X_0 \leq X_2 \leq X^i$ and a second reference time $T_2$ such that $T_2 \in ETA_R(X_2)$, a lower time profile $ETA_{RA1}(X)$ making it possible to achieve the first reference time $T_1$ corresponding to the translation of the first time of passage $T_{VA}(X)$ such that it passes through the first reference time $T_1$ at the abscissa $X_1$, an upper time profile $ETA_{RB2}(X)$ making it possible to achieve the second reference time $T_2$ corresponding to the translation of the second time of passage $T_{VB}(X)$ such that it passes through the second reference time $T_2$ at the abscissa $X_2$, and in which the step of determining a speed setpoint $V(X)$ further comprises the substeps:

segmenting the required interval $ETA_R(X_0)$ into a plurality of subintervals according to the speed strategy, associating with each subinterval a set of parameters according to the speed strategy, determining a subinterval $I_0$ in which the predicted time $T(X_0)$ is situated and, applying the speed strategy to said subinterval $I_0$ comprising computing a speed setpoint $V(X_0)$ from the set of parameters associated with said subinterval $I_0$, the speed strategy comprising choosing the speed setpoint $V(X_0)$ equal to $V_A(X_0)$ or $V_B(X_0)$ or to a setpoint $V_{A/B}(X_0)$, the setpoint $V_{A/B}(X_0)$ being determined on the basis of the speed profiles $V_A(X_0)$ and $V_B(X_0)$ weighted by the proportionality ratios between the current time $T(X_0)$, the lower time profile $ETA_{RA1}(X_0)$ and the upper time profile $ETA_{RB2}(X_0)$.

18. The method according to claim 17, in which the setpoint $V_{A/B}(X_0)$ is determined by the formula:

$$V_{A/B}(X_0) = \frac{(ETA_{RB2}(X_0) - ETA_{RA1}(X_0))V_A(X_0)V_B(X_0)}{(ETA_{RB2}(X_0) - T(X_0))V_B(X_0) - (ETA_{RA1}(X_0) - T(X_0))V_A(X_0)}.$$

19. The method according to claim 17, in which the first speed profile $V_A(X)$ or the second speed profile $V_B(X)$ is equal to a preferred speed profile $V_{opt}(X)$ corresponding to a speed of the aircraft computed for optimum flight conditions according to determined flight criteria, and not taking into account the plurality of constraints $RTA^i$.

20. The method according to claim 1, further comprising the steps:

computing a lateral trajectory, computing predicted parameters corresponding to predictions of flight parameters, such as an altitude profile, a speed profile, a weight of the aircraft, a predicted time of passage $T(X^i)$ for each constraint $RTA^i$ of the flight plan, displaying predicted parameters such as, for each constraint, the predicted time of passage $T(X^i)$ and/or the corresponding percentage of the constraint interval, the status of the constraint, the deviations from the constraint.

21. The method according to claim 20, further comprising a step comprising modifying and/or inserting at least one time constraint RTA to which the flight plan is subject.

22. A flight management system, embedded on an aircraft, comprising non-transitory code instructions for assisting in the navigation of the aircraft flying following a flight plan subject to a plurality of time constraints $RTA^i$ indexed by the index i varying from 1 to n, the index 1 corresponding to a time constraint closest to a current position ($P^{cour}$) of the aircraft and the index n corresponding to a time constraint furthest away from the current position, the position of the aircraft on the flight plan being identified as a function of a curvilinear abscissa X, a time constraint of index i $RTA^i$ being delimited by an earliest time of passage $RTA_{inf}^i$ and a latest time of passage $RTA_{sup}i$ and corresponding to a curvilinear abscissa $X^i$, the flight management system configured to:

determine a minimum speed profile ($V_{min}(X)$), a maximum speed profile ($V_{max}(X)$), and minimum ($T_{Vmin}(X)$) and maximum ($T_{Vmax}(X)$) times of passage for an aircraft flying respectively at the minimum ($V_{min}(X)$) and maximum ($V_{max}(X)$) speeds, as a function of the curvilinear abscissa X, said minimum and maximum speed profile being determined from at least performances and a state of the aircraft, determine, for each constraint $RTA^i$ of index i a restricted interval $RTA_R^i$ corresponding to a restricted time constraint interval and a required interval $ETA_R^i$ corresponding to a required time of passage interval for the aircraft at the waypoint $P_{RTA}^i$ of curvilinear abscissa $X^i$, said determination being made on the basis of minimum ($T_{Vmin}(X)$) and maximum ($T_{Vmax}(X)$) time-of-passage profiles and, by a first iterative computation, i being decremented from n−1 to 1 and comprising:

determine a required interval $ETA_R^i$ of index i enabling the aircraft to observe a restricted interval of index i+1 $RTA_R^{i+1}$ by flying according to a speed profile lying between the minimum ($V_{min}$) and maximum ($V_{max}$) speed profiles, said restricted interval of index i+1 $RTA_R^{i+1}$ being determined on the preceding iteration for an iteration of index lying between 1 and n−2, or from the time constraint of index n $RTA^n$ for the iteration of index n−1, determine a restricted interval $RTA_R^i$ of index i from the intersection of the time constraint $RTA^i$ and of the required interval $ETA_R^i$ of index i, a required interval of index i $ETA_R^i$ making it possible to observe all the restricted intervals of indices greater than i $RTA_R^{i+1}$, $RTA_R^{i+2}$, $RTA^n$ by flying according to a speed profile lying between the minimum ($V_{min}$) and maximum ($V_{max}$) speed profiles, when the constraints of indices greater than i $RTA^{i+1}$, $RTA^{i+2}$, ..., $RTA^n$ are mutually compatible, graphically display, to a pilot, information graphically illustrating compatibility of the aircraft to comply with said time constrains $RTA^i$ based on the interval $RTA_R^i$ and the required interval $ETA_R^i$.

23. A mission management system, being part of a ground station, comprising non-transitory code instructions for preparing a mission of an aircraft following a flight plan subject to a plurality of time constraints $RTA^i$ indexed by the index i varying from 1 to n, the index 1 corresponding to a time constraint closest to a current position ($P^{cour}$) of the aircraft and the index n corresponding to a time constraint furthest away from the current position, the position of the aircraft on the flight plan being identified as a function of a curvilinear abscissa X, a time constraint of index i $RTA^i$ being delimited by an earliest time of passage $RTA_{inf}^i$ and a latest time of passage $RTA_{sup}i$ and corresponding to a curvilinear abscissa $X^i$, the flight management system configured to:

determine a minimum speed profile ($V_{min}(X)$), a maximum speed profile ($V_{max}(X)$), and minimum ($T_{Vmin}(X)$) and maximum ($T_{Vmax}(X)$) times of passage for an aircraft flying respectively at the minimum ($V_{min}(X)$)

and maximum ($V_{max}(X)$) speeds, as a function of the curvilinear abscissa X, said minimum and maximum speed profile being determined from at least performances and a state of the aircraft, determine, for each constraint $RTA^i$ of index i a restricted interval $RTA_R^i$ corresponding to a restricted time constraint interval and a required interval $ETA_R^i$ corresponding to a required time of passage interval for the aircraft at the waypoint $P_{RTA}^i$ of curvilinear abscissa $X^i$, said determination being made on basis of minimum ($T_{Vmin}(X)$) and maximum ($T_{Vmax}(X)$ time-of-passage profiles and, by a first iterative computation, i being decremented from n−1 to 1 and comprising:

determine a required interval $ETA_R^i$ of index i enabling the aircraft to observe a restricted interval of index i+1 $RTA_R^{i+1}$ by flying according to a speed profile lying between the minimum ($V_{min}$) and maximum ($V_{max}$) speed profiles, said restricted interval of index i+1 $RTA_R^{i+1}$ being determined on the preceding iteration for an iteration of index lying between 1 and n−2, or from the time constraint of index n $RTA^n$ for the iteration of index n−1, determine a restricted interval $RTA_R^i$ of index i from the intersection of the time constraint $RTA^i$ and of the required interval $ETA_R^i$ of index i, a required interval of index i $ETA_R^i$ making it possible to observe all the restricted intervals of indices greater than i $RTA_R^{i+1}$, $RTA_R^{i+2}$, $RTA^n$ by flying according to a speed profile lying between the minimum ($V_{min}$) and maximum ($V_{max}$) speed profiles, when the constraints of indices greater than i $RTA^{i+1}$, $RTA^{i+2}$, ..., $RTA^n$ are mutually compatible, graphically display, to an operator, information graphically illustrating compatibility of the aircraft to comply with said time constrains $RTA^i$ based on the interval $RTA_R^i$ and the required interval $ETA_R^i$.

24. A computer program product, said computer program product comprising non-transitory code instructions for assisting in the navigation of an aircraft, said aircraft following a flight plan subject to a plurality of time constraints $RTA^i$ indexed by the index i varying from 1 to n, the index 1 corresponding to a time constraint closest to a current position ($P^{cour}$) of the aircraft and the index n corresponding to a time constraint furthest away from the current position, the position of the aircraft on the flight plan being identified as a function of a curvilinear abscissa X, a time constraint of index i $RTA^i$ being delimited by an earliest time of passage $RTA_{inf}^i$ and a latest time of passage $RTA_{sup}^i$ and corresponding to a curvilinear abscissa $X^i$, the non-statutory code instructions when executed by a computer perform the following steps:

determining a minimum speed profile ($V_{min}(X)$), a maximum speed profile ($V_{max}(X)$), and minimum ($T_{Vmin}(X)$) and maximum ($T_{Vmax}(X)$) times of passage for an aircraft flying respectively at the minimum ($V_{min}(X)$) and maximum ($V_{max}(X)$) speeds, as a function of the curvilinear abscissa X, said minimum and maximum speed profile being determined from at least performances and a state of the aircraft, determining, for each constraint $RTA^i$ of index i a restricted interval $RTA_R^i$ corresponding to a restricted time constraint interval and a required interval $ETA_R^i$ corresponding to a required time of passage interval for the aircraft at the waypoint $P_{RTA}^i$ of curvilinear abscissa $X^i$, said determination being made on the basis of minimum ($T_{Vmin}(X)$) and maximum ($T_{Vmax}(X)$ time-of-passage profiles and, by a first iterative computation, i being decremented from n−1 to 1 and comprising:

determining a required interval $ETA_R^i$ of index i enabling the aircraft to observe a restricted interval of index i+1 $RTA_R^{i+1}$ by flying according to a speed profile lying between the minimum ($V_{min}$) and maximum ($V_{max}$) speed profiles, said restricted interval of index i+1 $RTA_R^{i+1}$ being determined on the preceding iteration for an iteration of index lying between 1 and n−2, or from the time constraint of index n $RTA^n$ for the iteration of index n−1, determining a restricted interval $RTA_R^i$ of index i from the intersection of the time constraint $RTA^i$ and of the required interval $ETA_R^i$ of index i, a required interval of index i $ETA_R^i$ making it possible to observe all the restricted intervals of indices greater than i $RTA_R^{i+1}$, $RTA_R^{i+2}$, $RTA^n$ by flying according to a speed profile lying between the minimum ($V_{min}$) and maximum ($V_{max}$) speed profiles, when the constraints of indices greater than i $RTA^{i+1}$, $RTA^{i+2}$, ..., $RTA^n$ are mutually compatible, graphically displaying, to a pilot or an operator, information graphically illustrating compatibility of the aircraft to comply with said time constrains $RTA^i$ based on the interval $RTA_R^i$ and the required interval $ETA_R^i$.

25. A mission management system, being part of an air traffic control ground station, comprising non-transitory code instructions for performing flight predictions of an aircraft following a flight plan subject to a plurality of time constraints $RTA^i$ indexed by the index i varying from 1 to n, the index 1 corresponding to a time constraint closest to a current position ($P^{cour}$) of the aircraft and the index n corresponding to a time constraint furthest away from the current position, the position of the aircraft on the flight plan being identified as a function of a curvilinear abscissa X, a time constraint of index i $RTA^i$ being delimited by an earliest time of passage $RTA_{inf}^i$ and a latest time of passage $RTA_{sup}^i$ and corresponding to a curvilinear abscissa $X^i$, the mission management system configured to:

determine a minimum speed profile ($V_{min}(X)$), a maximum speed profile ($V_{max}(X)$), and minimum ($T_{Vmin}(X)$) and maximum ($T_{Vmax}(X)$) times of passage for an aircraft flying respectively at the minimum ($V_{min}(X)$) and maximum ($V_{max}(X)$) speeds, as a function of the curvilinear abscissa X, said minimum and maximum speed profile being determined from at least performances and a state of the aircraft, determine, for each constraint $RTA^i$ of index i a restricted interval $RTA_R^i$ corresponding to a restricted time constraint interval and a required interval $ETA_R^i$ corresponding to a required time of passage interval for the aircraft at the waypoint $P_{RTA}^i$ of curvilinear abscissa $X^i$, said determination being made on the basis of minimum ($T_{Vmin}(X)$) and maximum ($T_{Vmax}(X)$ time-of-passage profiles and, by a first iterative computation, i being decremented from n−1 to 1 and comprising:

determine a required interval $ETA_R^i$ of index i enabling the aircraft to observe a restricted interval of index i+1 $RTA_R^{i+1}$ by flying according to a speed profile lying between the minimum ($V_{min}$) and maximum ($V_{max}$) speed profiles, said restricted interval of index i+1 $RTA_R^{i+1}$ being determined on the preceding iteration for an iteration of index lying between 1 and n−2, or from the time constraint of index n RTA$^n$ for the iteration of index n−1, determine a restricted interval RTA$_R^i$ of index i from the intersection of the time constraint RTA$^i$ and of the required interval ETA$_R^i$ of index i, a required interval of index i ETA$_R^i$ making it possible to observe all the restricted intervals of indices greater than i RTA$_R^{i+1}$, RTA$_R^{i+2}$, RTA$^n$ by flying according to a speed profile lying between the minimum (V$_{min}$) and maximum (V$_{max}$) speed profiles, when the constraints of indices greater than i RTA$^{i+1}$, RTA$^{i+2}$, ..., RTA$^n$ are mutually compatible, graphically display, to an operator, information graphically illustrating compatibility of the aircraft to comply with said time constrains RTA$^i$ based on the interval RTA$_R^i$ and the required interval ETA$_R^i$.

26. A mission management system, being part of a ground station, comprising non-transitory code instructions for performing mission preparation and tracking of a drone following a flight plan subject to a plurality of time constraints RTA$^i$ indexed by the index i varying from 1 to n, the index 1 corresponding to a time constraint closest to a current position (P$^{cour}$) of the aircraft and the index n corresponding to a time constraint furthest away from the current position, the position of the aircraft on the flight plan being identified as a function of a curvilinear abscissa X, a time constraint of index i RTA$^i$ being delimited by an earliest time of passage RTA$_{inf}^i$ and a latest time of passage RTA$_{sup}^i$ and corresponding to a curvilinear abscissa X$^i$, the mission management system configured to:

determine a minimum speed profile (V$_{min}$(X)), a maximum speed profile (V$_{max}$(X)), and minimum (T$_{Vmin}$(X)) and maximum (T$_{Vmax}$(X)) times of passage for an aircraft flying respectively at the minimum (V$_{min}$(X)) and maximum (V$_{max}$(X)) speeds, as a function of the curvilinear abscissa X, said minimum and maximum speed profile being determined from at least performances and a state of the aircraft, determine, for each constraint RTA$^i$ of index i a restricted interval RTA$_R^i$ corresponding to a restricted time constraint interval and a required interval ETA$_R^i$ corresponding to a required time of passage interval for the aircraft at the waypoint P$_{RTA}^i$ of curvilinear abscissa X$^i$, said determination being made on basis of minimum (T$_{Vmin}$(X)) and maximum (T$_{Vmax}$(X) time-of-passage profiles and, by a first iterative computation, i being decremented from n−1 to 1 and comprising:

determine a required interval ETA$_R^i$ of index i enabling the aircraft to observe a restricted interval of index i+1 RTA$_R^{i+1}$ by flying according to a speed profile lying between the minimum (V$_{min}$) and maximum (V$_{max}$) speed profiles, said restricted interval of index i+1 RTA$_R^{i+1}$ being determined on the preceding iteration for an iteration of index lying between 1 and n−2, or from the time constraint of index n RTA$^n$ for the iteration of index n−1, determine a restricted interval RTA$_R^i$ of index i from the intersection of the time constraint RTA$^i$ and of the required interval ETA$_R^i$ of index i, a required interval of index i ETA$_R^i$ making it possible to observe all the restricted intervals of indices greater than i RTA$_R^{i+1}$, RTA$_R^{i+2}$, RTA$^n$ by flying according to a speed profile lying between the minimum (V$_{min}$) and maximum (V$_{max}$) speed profiles, when the constraints of indices greater than i RTA$^{i+1}$, RTA$^{i+2}$, ..., RTA$^n$ are mutually compatible, graphically display, to an operator, information graphically illustrating compatibility of the aircraft to comply with said time constrains RTA$^i$ based on the interval RTA$_R^i$ and the required interval ETA$_R^i$.

* * * * *